US008710779B2

(12) United States Patent
Wyrembra

(10) Patent No.: US 8,710,779 B2
(45) Date of Patent: Apr. 29, 2014

(54) BRUSHLESS ELECTRIC MOTOR OR GENERATOR IN SHELL CONSTRUCTION

(76) Inventor: Hans-Peter Wyrembra, Penzing (DE)

( * ) Notice: Subject to any disclaimer, the term of this patent is extended or adjusted under 35 U.S.C. 154(b) by 230 days.

(21) Appl. No.: 13/293,723

(22) Filed: Nov. 10, 2011

(65) Prior Publication Data

US 2012/0126731 A1 May 24, 2012

(30) Foreign Application Priority Data

Nov. 11, 2010 (DE) .................... 20 2010 015 364 U
Dec. 16, 2010 (DE) ........................ 10 2010 054 847

(51) Int. Cl.
*H02P 23/12* (2006.01)

(52) U.S. Cl.
USPC .................. 318/400.14; 318/430; 310/49.01; 310/49.04; 310/60 A; 310/64

(58) Field of Classification Search
USPC ............. 310/49.01, 49.04, 60 A, 64, 216.04, 310/216.074; 318/400.14, 430
See application file for complete search history.

(56) References Cited

U.S. PATENT DOCUMENTS 4,739,201 A * 4/1988 Brigham et al. ........... 310/49.01
5,691,583 A 11/1997 Suzuki et al.
5,831,356 A * 11/1998 Aoshima .................... 310/49.04
6,081,053 A * 6/2000 Maegawa et al. .......... 310/49.39
6,201,324 B1 3/2001 Suzuki et al.
6,956,312 B2 * 10/2005 Inayama et al. ......... 310/156.41
6,992,418 B2 * 1/2006 Hans ...................... 310/216.091
7,667,361 B2 * 2/2010 Nobe et al. ...................... 310/90
7,679,255 B2 * 3/2010 Evans et al. ........... 310/216.004
7,705,511 B2 * 4/2010 Evans .................... 310/216.074
7,839,042 B2 * 11/2010 Hashimoto et al. ...... 310/156.35
8,415,843 B2 * 4/2013 Li et al. ....................... 310/60 A
2002/0140308 A1 * 10/2002 Inayama et al. ......... 310/156.47
2004/0007924 A1 1/2004 Ogawa
2004/0124732 A1 * 7/2004 Hans ............................ 310/216
2005/0023927 A1 * 2/2005 Inayama et al. .............. 310/261
2005/0029888 A1 * 2/2005 Inayama et al. ......... 310/156.41
2005/0046305 A1 3/2005 Matsushita et al.
2006/0192443 A1 8/2006 Rhyu et al.
2007/0138876 A1 * 6/2007 Evans et al. ..................... 310/10
2007/0296394 A1 * 12/2007 Landry et al. ................. 323/371
2008/0018196 A1 * 1/2008 Enomoto et al. .............. 310/257
2008/0042511 A1 * 2/2008 Evans ........................... 310/216

(Continued)

FOREIGN PATENT DOCUMENTS

CH 448 244 12/1967
DE 10 2007 002 443 A1 7/2008

*Primary Examiner* — Paul Ip
(74) *Attorney, Agent, or Firm* — The Eclipse Group LLP

(57) ABSTRACT

The invention relates to an electric motor having at least two stators disposed coaxially to each other and a rotor, wherein each stator has 2*n poles, with n=1, 2, 3, . . . , wherein each stator has at least one common coil or winding for all poles, wherein each stator has a first and second partial shell, wherein each partial shell has a shell bottom and n poles, wherein each pole is formed as a tooth extending in axial direction or substantially in axial direction and beginning on the shell bottom, wherein with assembled partial shells of a stator the tooth or the teeth of the first partial shell is or are disposed in alternating manner in circumferential direction with the tooth or the teeth of the second partial shell, and wherein with assembled partial shells or a stator, the at least one coil) or winding is received between the partial shells.

18 Claims, 22 Drawing Sheets

(56) References Cited

U.S. PATENT DOCUMENTS

2008/0315669 A1 12/2008 Kwon et al.
2009/0167106 A1* 7/2009 Hashimoto et al. ........... 310/257
2011/0057523 A1* 3/2011 Li et al. ........................... 310/64

* cited by examiner

A
B
16
14
22
18b
8b
2-2
8a
8a
4a
8b
2-1
18a
4b
4b
8a
12
4a
6a
18a
16
6a
18b

A
B
C
D
52-1
52-2
54
54a
54b
56
56a
56b
58a
58b
60
60a
60b
62
64
66
68a
68b
70

152b
152a
150
166
164
162

152b
152a
164

154
70
158
152
154
159

150
164

106
112
110
104
108

102b
102a
118
122
118
159

152b
150
70
152a
70
164

104
120
104
102

102b
102a
102b
102a
118

116
114
118

122
196
194
180
198
182b
182a 184
189
182
170

184
188
189
189

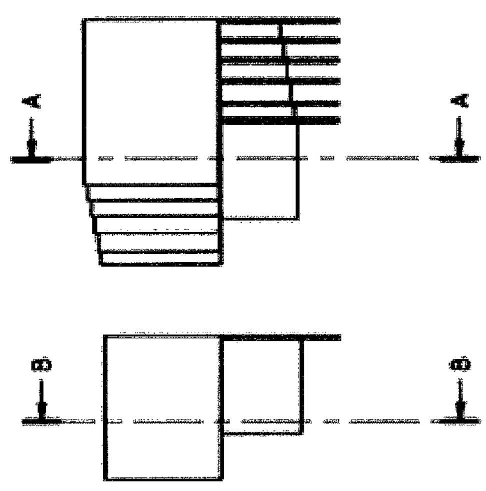
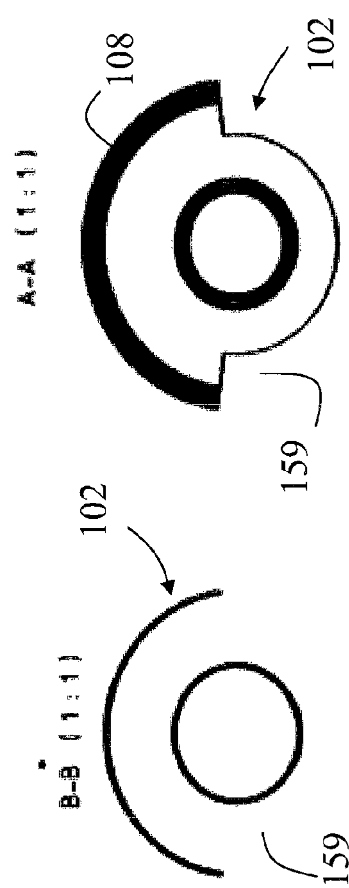
Fig. 31
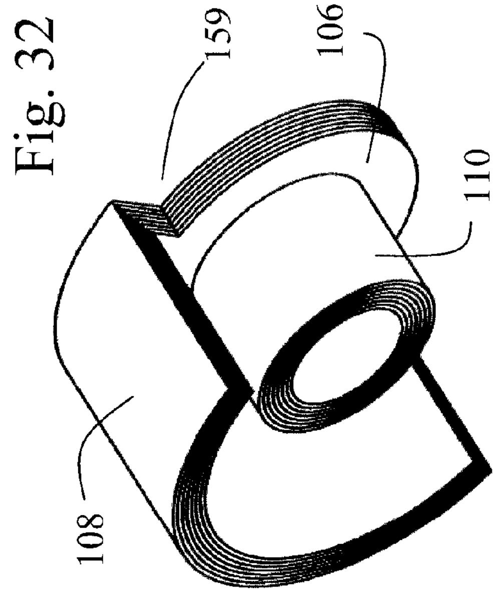
Fig. 32
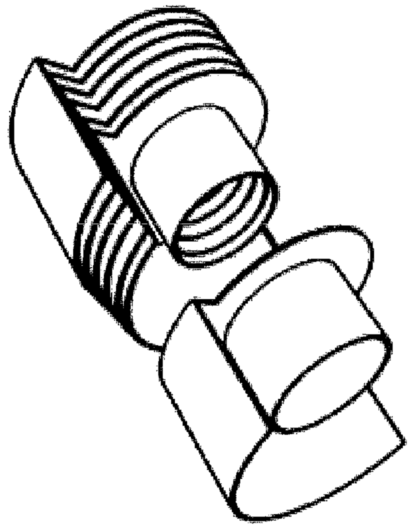

240
250a
250a
249
248
248
control signals for
rotation speed control
+
+
pulse width
220a
220b
266
242
push
operation
feedback
position
induction
-
-
248
248
and/or
250b
Sense
262
250b
260
248
rotor position
246
249
264
244
258
258
252
+
254
+
-
DC out
256

249
248
50a
220a
248
250a
220b
control signals for rotation speed control
impuls width
controller 242
push
operation
position
feedback
induction
D1
D3
D2
D4
D5
D7
D6
D8
+
-
or
Sense
264
262
rotor position
260
249
250b
250b
sensor 246

250a
+
charging current
248
D1
D3
248
270
220a
248
D2
D4
248
250b
-
charging current stator module 2-1
stator module 2-2
stator offset
U
t 250a
+
charging current controlled
248
248
D1
D3
270
220a
D2
D4
248
248
R
250b
-
charging current controlled

BRUSHLESS ELECTRIC MOTOR OR GENERATOR IN SHELL CONSTRUCTION

RELATED APPLICATIONS

This application claims priority of German Utility Model Application Serial No. 20 2010 015 364.6 filed Nov. 11, 2010 and German Patent Application No. 10 2010 054 847.2 filed Dec. 16, 2010; both applications of which are incorporated in their entirety by reference in this application.

BACKGROUND OF THE INVENTION

1. Field of the Invention

The invention relates to a brushless electric motor or generator constructed of at least two stator modules and having each one winding per stator module for magnetizing at least two teeth of the stator module.

2. Related Art

From EP 1 289 097 A2, an electric motor is known, in which annular coils are provided axially centered and offset to each other in axial direction, which magnetize alternatively encompassing rotors.

From EP 1 708 338 A1 (corresponding to US 2006 0 244 332 A1), an electric motor is known, in which stator modules are disposed in identical construction axially offset in succession, wherein the radially oriented stator teeth of each module are provided with a winding. The winding teeth of the stators are disposed angularly offset to each other, and each winding of a module is separately driven by a bridge converter circuit. By the phase-shifted, preferably square pulse shaped drive of the coils, the torque can be established and the motor develops a high torque with compact construction. In the motor formed as an internal or external rotor, permanent magnets with circumferentially alternating polarity are provided on the circumference of the rotor.

SUMMARY

It is the object of the invention to provide an electric motor—preferably also operating as a generator—in which inexpensive manufacture is achieved due to its construction. It is a further object to provide a method of efficiently operate the electric motor using a motor drive unit.

This object is solved by the features of claims 1, 14 and 15, respectively. Advantageous embodiments are the subject matter of the dependent claims.

According to claim 1, a brushless electric motor in module construction with at least two stators (which can also be referred to as stator modules) disposed coaxially to each other is provided, wherein each stator is formed in partial shell construction. Therein, each stator is composed of a first and a second partial shell, wherein the first and second partial shell are preferably constructed identically to each other. Preferably, the partial shells are each constructed as an integral unit, for example formed in one piece from a single material part. Alternatively or additionally, each partial shell is formed of a layered or multi-sandwiched system of sheets preferably insulated from each other in order to suppress or reduce eddy currents. Each stator has two poles or a multiple of two poles, wherein the preferred basic form of a stator has exactly two poles. Each partial shell bears or supports half of the number of the poles of a stator, and after assembling the two partial shells of each stator, the pole teeth of the two partial shells at least partially overlap in axial direction, wherein the tooth or teeth of the first partial shell circumferentially alternate(s) with the tooth or teeth of the second partial shell. At least the sections of the pole teeth magnetically active for driving the motor extend in axial direction or substantially in axial direction. Here, axial direction means the direction of the rotational axis after assembling the at least two stators for operation of the electric motor. Each stator has at least a common coil or winding for all poles, wherein the poles or pole teeth as such are not wound, but comprise the at least one common coil or winding. With assembled partial shells of a stator or stator module, the common coil or winding is received between them.

In that at least one common coil or winding is provided for all poles of each stator, which is received between the partial shells with assembled partial shells, and in that the assembly of the partial shells with the at least one intervening coil or winding represents the "winding" of all pole teeth, an electric motor assembled in simple mechanical manner is provided such that the manufacturing costs thereof decrease compared with the individual winding of teeth. Further cost reduction results if preferably the stators are identically constructed, i.e. are identical parts.

The "winding" of a stator can for example be configured such that at least one common coil or winding (preferably exactly one coil or winding) is inserted between the two partial shells to be assembled as a separate component initially present in pre-assembled state. Or only one of the two partial shells or both partial shells are pre-wound with each one coil and completing a stator is effected by assembling the one wound partial shell with a non-wound partial shell or by assembling the two pre-wound partial shells.

Each one of the partial shells has a shell bottom, which forms a front-side termination of each stator with assembled motor. That is, with assembled partial shells of a stator, the first partial shell forms an axial termination of the stator and the second partial shell forms an opposing axial termination of the stator. The at least one coil or winding is disposed axially in between. Preferably, the pole teeth are attached to the shell bottom and extend from the shell bottom in axial direction to the respectively opposing partial shell. That is, with assembled partial shells and in lateral top view of the stators, the stator tooth or teeth extend(s) from the shell bottom of the first partial shell in axial direction from left to right. And in the second partial shell, the pole tooth or teeth extend(s) from the shell bottom disposed on the right to the left towards the shell bottom of the first partial shell.

If reference is made to "the coil" in the following, it comprises or is the at least one common coil or winding, unless otherwise stated. However, preferably, exactly one common coil is provided per stator.

If the coil is excited with assembled partial shells, the magnetic flux extends within the partial shells around the coil received between the partial shells. Since the pole or stator teeth of the first partial shell encompass the coil "left" around, while the stator teeth of the second partial shell encompass the coil "right" around, the stator tooth or the stator teeth of the first partial shell constitute(s) the magnetizing ends (south or north pole), which are oppositely magnetized to the stator tooth or the stator teeth of the second partial shell, which constitute(s) the opposing magnetic end (north or south pole).

Upon excitation of the at least one coil or winding of a stator in circumferential direction, the magnetization of the poles is preferably polarized in alternating manner, wherein the magnetic flux between the teeth of the stator and the poles of the rotor is in particular radially or substantially radially oriented with opposite polarity (south pole/north pole; north pole/south pole).

In an embodiment, each stator has exactly 2 poles and/or each stator has exactly one coil or winding for all stator poles and/or the rotor has the same number of poles or magnets as each of the stators for each of the stators of a motor composed of multiple stators (stator modules).

Preferably, a common rotor is provided for all stators. In an embodiment hereof, the poles or magnets of the rotor extend over the entire length of all stators and/or the rotor or magnet poles extend over the entire length of all stators without angular offset. Alternatively hereto, the poles or magnets of the rotor each extend only over the axial length or magnetically active length of the individual stators. Preferably without angular offset over the entire length of all of the stators.

In an external rotor, the at least two stators are disposed within the rotor and surrounded by the (preferably permanent) magnetic elements of the rotor such that starting from the pole teeth the magnetic flux is oriented radially towards the permanent magnets. The radial flux direction of the pole teeth of the first partial shell is inverse to the flux direction of the pole teeth of the second partial shell. Since the pole teeth of the partial shells are disposed in alternating manner, thus, the flux direction or polarity of the pole teeth is also circumferentially alternating.

In an embodiment of the external rotor, with assembled partial shells of each stator, the internal rim or the internal partial rims form a closed cylinder surface between the shell bottoms of each stator. Alternatively or additionally, the at least one common coil or winding is disposed in the volume delimited by the two shell bottoms, the internal rim or the internal rims and the external rim volume.

In case of an internal rotor, the rotor with the (preferably permanent) magnetic elements are disposed within the stators and the flux from the pole teeth of the stators extends radially, also in circumferential direction with alternating flux direction according to whether the pole teeth are those of the first or the second partial shell. Preferably, the poles of two stators are offset to each other by the angle of 360°/(4*n) with respect to the common axis. For example, with each two poles per stator and two stators, the pole pairs of the one stator are offset by 90° to the pole pair of the other stator. By the angular offset of the poles of the at least two stators it is achieved that upon standstill of the motor, a torque for start-up of the motor can arise in any case, and on the other hand, in operation of the motor, by the time-shifted drive of the separated coils of the two stators, circumferential uniform distribution of the torques is achieved during a revolution of the rotor. Similarly, the detent torques are reduced.

In an embodiment of the internal rotor, with assembled partial shells of each stator, the external rim or the external partial rims form a closed cylinder surface between the shell bottoms of each stator. Alternatively or additionally, the at least one common coil or winding is disposed in the volume delimited by the two shell bottoms, the external rim or the external rims and the internal tooth rim.

Preferably, with assembled partial shells, the teeth of the partial shells are circumferentially interdigitally disposed or alternately mesh with each other such that tight tooth rows arise in circumferential direction, however, a distance or gap is present between the alternating pole teeth of the two partial shells. The distance is such that "contact" does not occur between the alternating pole teeth in circumferential direction and on the one hand between the shell bottom of the one partial shell of a stator a distance to the axial front side of the pole tooth or teeth of the other partial shell of a stator is present. Therein, the "distance" between the pole teeth can be formed by an air gap or be filled by a material, which prevents magnetic short-circuit between the teeth of the partial shells.

Preferably, a rotor is provided for all of the stators for the brushless electric motor, that is, a mechanically unitarily configured rotor extending axially over all of the stators. Alternatively, the rotor can be formed of rotor modules coupled mechanically to each other and separately provided for each stator. For all stator or rotor module of the motor the preferably common rotor has the same number of poles as the number of the pole teeth of each of the individual stators. With the assembled, unitary rotor, a rotor pole set (a magnetic element set) can be separately provided per stator, which extends along the axial depth of the respective stator. Or a set of rotor poles can be provided in the common unitary rotor, wherein the rotor poles extend along the entire axial depth of all of the stators of the motor. In circumferential direction, the rotor poles are disposed with alternating radial polarity. That is, corresponding to the alternating polarity of the pole teeth of the stators, the radial orientation of the poles of the rotor is also circumferentially alternating. Preferably, the rotor poles are formed of magnetic elements, preferably of permanent magnets.

In an embodiment of the motor as an external rotor, the teeth of each stator are formed as an external tooth rim. Preferably, herein, the teeth extending in alternating manner from left and right from the first and second partial shell are attached to the exterior of the shell bottoms of the partial shells. Preferably, the shell bottoms of the partial shells form a bottom with closed surface or the shell bottoms are annular surfaces with closed annular surface, wherein an axle or shaft is for example insertable into the central hole of the annular bottom. The shell bottom or annular shell bottom closed in terms of surface area improves the efficiency of conductance of the magnetic flux from the environment around the coil towards pole tooth or pole teeth. Preferably, the back-closure of the magnetic field is effected in the rotor or with each of the rotors in the rotor itself or in the rotors themselves. In the external rotor, e.g. via the rotor sleeve and in the internal rotor by the rotor axle or the rotor cylinder.

In an embodiment of the external rotor, both partial shells or at least one of the partial shells have an internal rim or internal partial rim conducting the magnetic flux from the interior of the coil to the exterior towards pole teeth in the assembled state of the partial shells. Preferably, a closed internal rim is formed between the two partial shells with assembled partial shells of a stator, wherein the closed internal rim is formed of partial rims of the two partial shells or of an internal rim of one of the partial shells. Alternatively, the internal rim is a sleeve inserted between the two partial shells, which extends between the partial shells. With closed interior surface due to the internal rim, the efficiency of the orientation of the magnetic flux towards pole teeth is also increased. Preferably, the internal rim or the internal partial rims of the partial shell form an axle yoke.

Preferably, the coil is formed as an annular coil or torus, which is received in a volume with the external rotor. The coil is received on the preferably cylinder jacket shaped exterior surface by the alternating tooth poles, on the front sides by each one of the shell bottoms of the partial shells and in the interior by the internal rim or the internal partial rims. Preferably, the internal rim or the inner partial rims and/or the shell bottoms (disk surface or annular disk surface) is or are formed as closed surfaces.

In a further embodiment, the electric motor is formed as an internal rotor, wherein the rotor is axially internally disposed and is surrounded by the at least two axially offset stators. In the internal rotor, the teeth of the partial shells of each stator disposed in alternating manner constitute an internal tooth rim. Preferably, the teeth are attached to the internal rim of the shell bottoms. In an embodiment, to the exterior of the shell bottoms of at least one of the partial shells, an external rim is attached, however, preferably, an external partial rim is respectively attached to both partial shells of a stator. Preferably, the external rim or the external partial rims form a closed cylinder jacket shaped surface. Preferably, the two annular surface shaped shell bottoms of the two partial shells of each stator are also closed in terms of surface area. Preferably, the external rim or the external partial rims together forms or form an external yoke.

With assembled partial shells of an internal rotor stator, the coil is received in the volume, which is exteriorly formed by the partial rim or the external partial rims, at the front side at the axial ends by the shell bottoms and in the interior by the tooth rim of the pole teeth of the partial shells disposed in alternating manner.

Preferably (for example in the external rotor or in the internal rotor), the coil ("the at least one common coil or winding") is an annular coil, which is axially centered oriented to the rotational axis of the electric motor.

One, more or all of the partial shells of an electric motor is or are preferably monolithically formed of one element. For example of a forged or cast solid iron (core). Furthermore, the partial shell(s) can be formed (for example as a core) from a ferrite, an iron powder or of a similar sintered, glued and/or pressed magnetically conductive material. Alternatively, the one, more or all partial shells of an electric motor is or are formed of a stack of at least two partial shells stacked on top of each other and preferably electrically insulated from each other, as described below. Preferably, one, more or all of the partial shells of an electric motor is or are formed of forged or cast solid iron, in particular as a forged or cast solid core. Alternatively or additionally, one, more or each partial shell of the electric motor is formed of a ferrite, an iron powder or of a similar sintered, glued and/or pressed magnetically conductive material.

In the above embodiments, the individual features, feature combinations or entire subassemblies can be integrated or replaced in one of the other embodiments without restriction. These possible combinations are included in the content of disclosure.

According to a method for manufacturing a partial shell of an electric motor as is described above or in the following: a stack of sheets insulated from each other is transformed into the shape of a partial shell by means of shaping or forging, or a number of blank sheets is transformed into the shape of a partial shell by means of shaping or forging, which are inserted into each other for forming the partial shell, wherein the electrical insulation between the partial shell elements is provided before or after shaping.

Advantageously, after forming the stack of sheets or after inserting the partial shell elements into each other, the contours of the partial shell are smoothed or processed into the final partial shell shape.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 31 illustrates a stator partial shell in further embodiment of the partial shell of FIG. 13—here with a recess for receiving the mating stator tooth.

FIG. 32 illustrates the stator partial shell of FIG. 31 after leveling of the edges.

DETAILED DESCRIPTION

Figure 1:
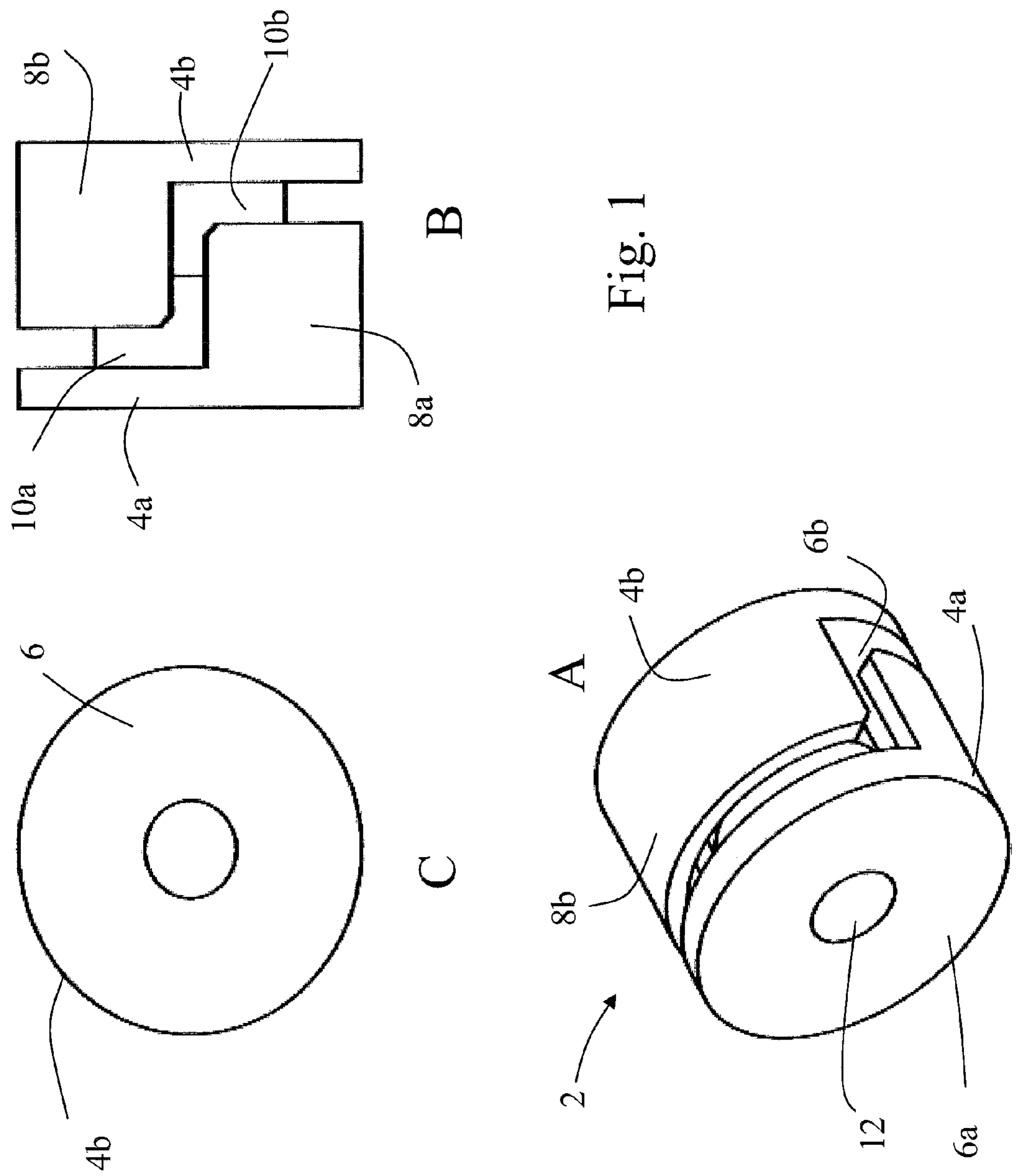
FIG. 1 illustrates various views of an individual stator module without coil for an external rotor.

FIG. 1 shows various views of a stator module 2 provided for an external rotor. At A a perspective view, at B a side view and at C a front-side view in axial direction is seen. In these representations, no annular coil 20 is shown—cf. the annular coils 20 drawn in the perspective view of FIG. 3. A stator module 2 is composed of a first partial shell **4*a* and a second partial shell 4*b*. In the represented embodiments, the partial shells 4*a*, 4*b* are identical parts, thus identically constructed. In other embodiments, the partial shells can be constructed varying from each other. For example, the internal sleeve 10 or the external sleeve 60 can be formed shorter or not at all in one of the partial shells, while the internal sleeve 10 or external sleeve 60** is formed longer or completely at the other partial shell. Or the internal shell or external shell can be inserted between the shell bottoms as an initially separate module component.

The partial shells **4*a*, 4*b* each have an annular disk shaped shell bottom 6, from which a respective pole tooth 8*a* or 8*b* extends in axial direction in the represented embodiment. The axial direction is the rotational axis of symmetry of the shell bottom 6 or the rotational axis of the assembled stator module 2 and of the motor formed thereof (see below). Since FIG. 1 represents a stator module 2 for an external rotor, in which the rotor rotates about the outer circumference of the stator module, the pole teeth 8 are disposed on the outer circumference of the partial shells 4 or the stator module 2. On the inner circumference of the partial shells 4*a*, 4*b*, an internal sleeve 10 is each disposed, through which a shaft hole 12 extends. As is represented in FIG. 1*b*, the axial front sides of the internal sleeves 10 of the shells 4*a*, 4*b* flatly abut each other in the assembled stator module and form a continuous internal sleeve 10 extending without gap between the two shell bottoms 6*a*, 6*b* in the assembled state. In this assembled state, an air gap extends between the pole teeth 8*a*, 8*b* as well as between the axial front side of a pole tooth 8*a*, 8*b* and the opposing shell bottom 6*b*, 6*a* of the respectively opposing partial shell 4*b*, 4*a*. Thus, with assembled partial shells 4*a*, 4*b*, the volume between the partial shells is internally closed by the closed continuous sleeve 10 and closed on the front side by the closed annular disks of the shell bottoms 6*a*, 6*b*, while the outer circumference is alternatively circumferentially limited by a pole tooth 8*a* of the one partial shell 4*a* and a pole tooth 8*b* of the second partial shell 4*b*** with intervening air gap.

Figure 3:
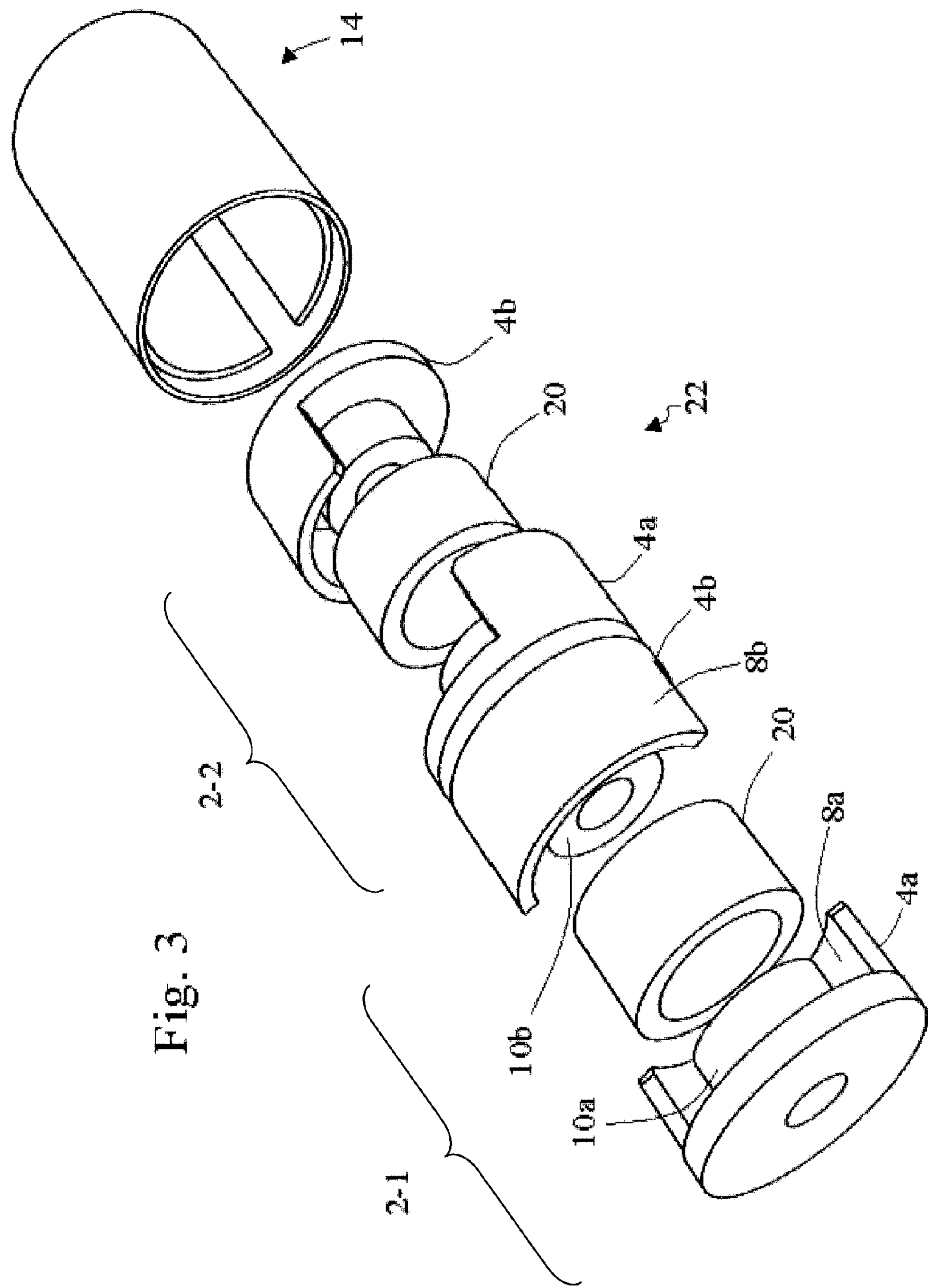
FIG. 3 is a perspective, exploded view of the electric motor of FIG. 2 with each one annular coil per stator module.
Figure 11:
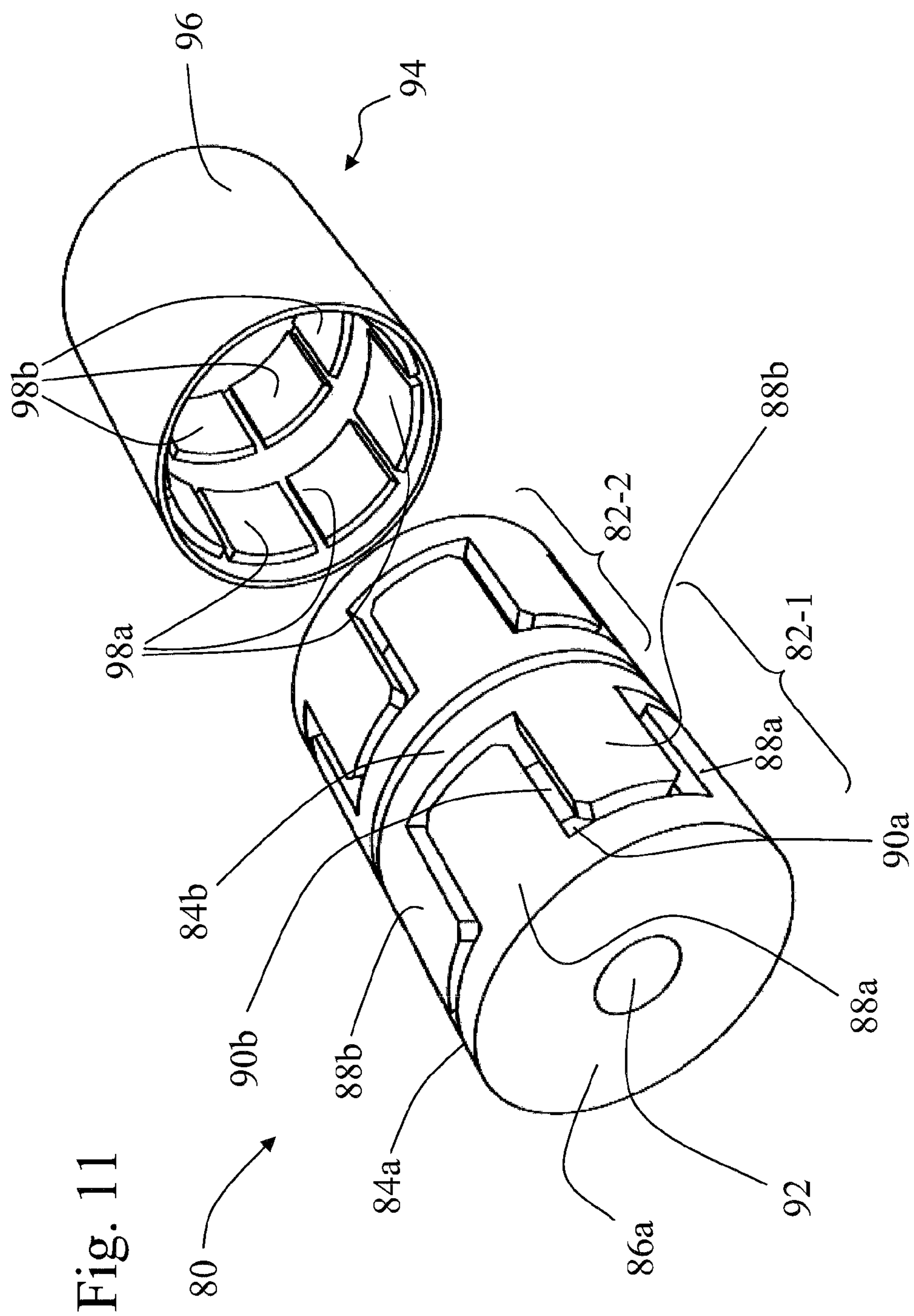
FIG. 11 illustrates an electric motor formed as an external rotor with 8 poles per stator module.

If a coil 20 shown in FIG. 3 is inserted into such a stator module and direct current is conducted through the annular coil, the magnetic flux around the annular coil results in magnetic flux in the partial shells, wherein the pole teeth **8*a* of the one partial shell 4*a* always form north poles (or south poles according to current direction) and the other pole teeth 8*b* of the second partial shell 4*b* always form south poles (or north poles according to current direction) with static current. This applies independently of the number of the pole teeth. For example, the pole teeth 88*a* of the partial shell 84*a* of a stator module 82 represented in FIG. 11 are always north poles (south poles), while the pole teeth 88*b* of the second partial shell 84*b*** disposed circumferentially in alternating manner always form south poles (north poles).

Figure 2:
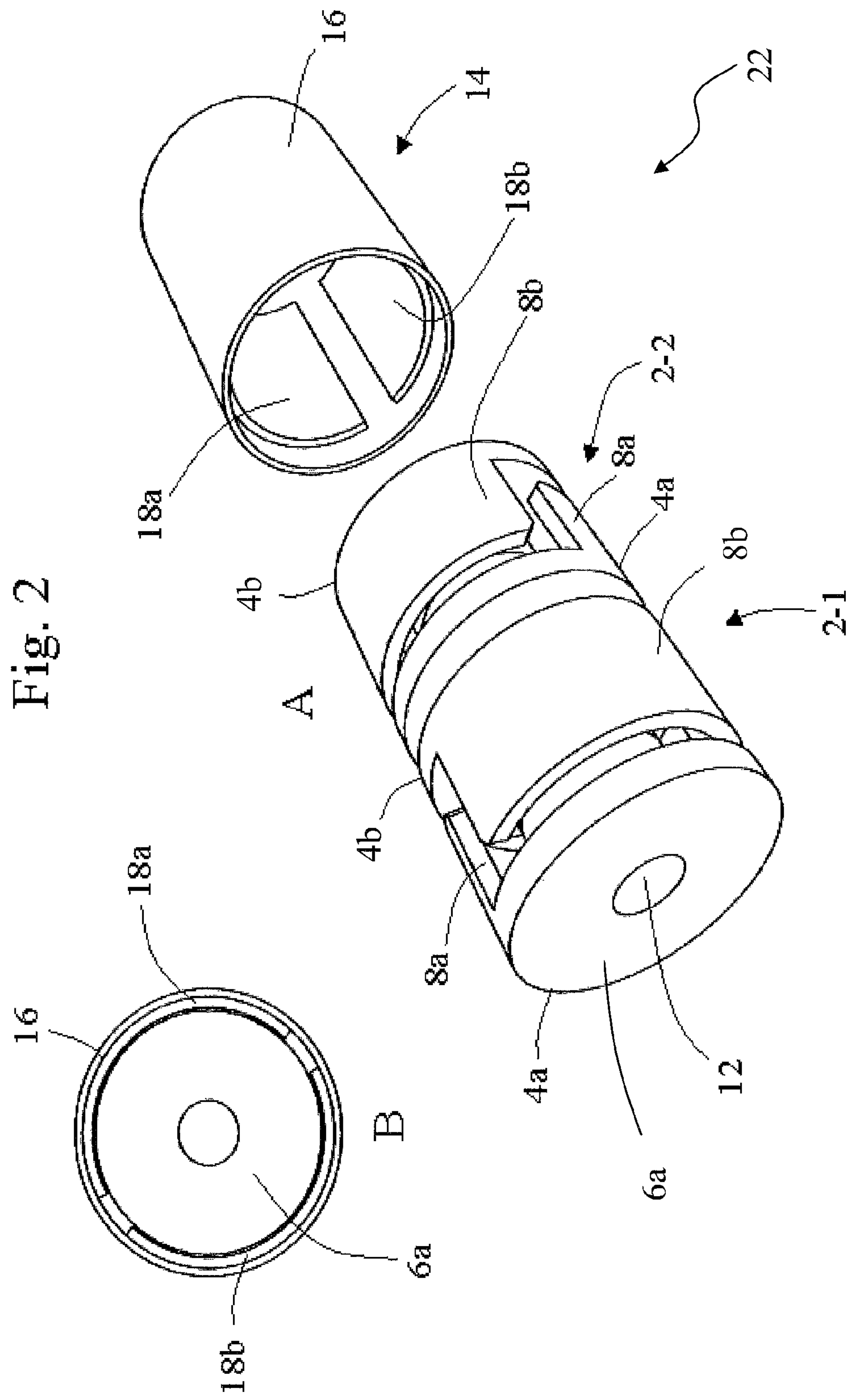
FIG. 2 illustrates various views of an electric motor composed of two stator modules illustrated in FIG. 1.

FIG. 2 shows at A a perspective view of a motor 22 composed of two stator modules 2-1, 2-2. The stator modules 2-1 and 2-2 are identical to the stator module 2 of FIG. 1 and are disposed offset in succession in axial direction. In circumferential direction, the stator modules 2-1, 2-2 are angularly offset to each other such that the offset between the pole teeth 8 of the first stator 2-1 to those of the second stator 2-2 is exactly half of the angle present between two circumferentially consecutive pole teeth of a stator module. In the electric motor represented in FIG. 2, the pole number per stator 2 is exactly two (pole number n=2) and the angle between the two pole teeth **8*a*, 8*b* of a stator 2-1 or 2-2 is exactly 180°. The angular offset between the pole teeth of the stator module 2-1 to the pole teeth of the second stator module 2-2 is therefore 90° (angular offset between the pole teeth 8 of two stator modules 2 is 360°: (4×n), wherein "n" is half of the pole number per stator. In the stator modules illustrated in FIGS. 1 and 2, thus there is n=1). In the embodiment illustrated in FIG. 11, the number of pole teeth 88 per stator 82** is eight, wherein n=4 and 360°: (4×4)=22.5° angular offset between the two stator modules).

For forming the motor, the stator modules 2-1 and 2-2 illustrated in FIG. 2 are inserted into the external rotor 14. In the inserted state, the rotor sleeve 16 of the rotor 14 surrounds the two stator modules 2-1 and 2-2. On the interior side of the rotor sleeve 16, two permanent magnets **18*a*, 18*b* are disposed extending in axial direction. The permanent magnets 18*a*, 18*b* are disposed in circumferential direction of the rotor sleeve 16 with alternating polarity. With increase of the number of the poles of the stator module, the number of the poles or the number of the permanent magnets is also increased and they are in turn disposed with alternating polarity. Therein, the polarity is oriented in radial direction such that towards the interior of the rotor sleeve 16, a permanent magnet 18** represents either a north pole or a south pole.

Besides the mechanical reception of the magnets, the rotor sleeve also serves as a pole closure ring and is therefore designed magnetically conductive. At B, FIG. 2 shows a front-side view in axial direction of the assembled electric motor 22, wherein the front side of the shell bottom 6*a* is seen. The partial shell 4*a* of the front stator module 2-1 is surrounded by the rotor sleeve 16, at the side of which the permanent magnets 18*a* and 18*b* are disposed circumferentially offset. Between the inner surfaces of the permanent magnets 18 and the outer sides of the pole teeth 8*a*, 8*b*, a small air gap is present. The rotor 14 of the external rotor is rotatably supported and the rotation of the rotor 14 is transmitted to a drive shaft (not shown).

FIG. 3 shows a perspective, exploded view of the motor 22 of FIG. 2. In this representation, the annular coils 20 are shown in, which are oriented coaxially to the center axis of the stator modules 2 or the rotational axis of the motor 22. Each one of the annular coils 20 is received between the two partial shells 4*a*, 4*b* of one of the stator modules 2-1, 2-2.

Figure 4:
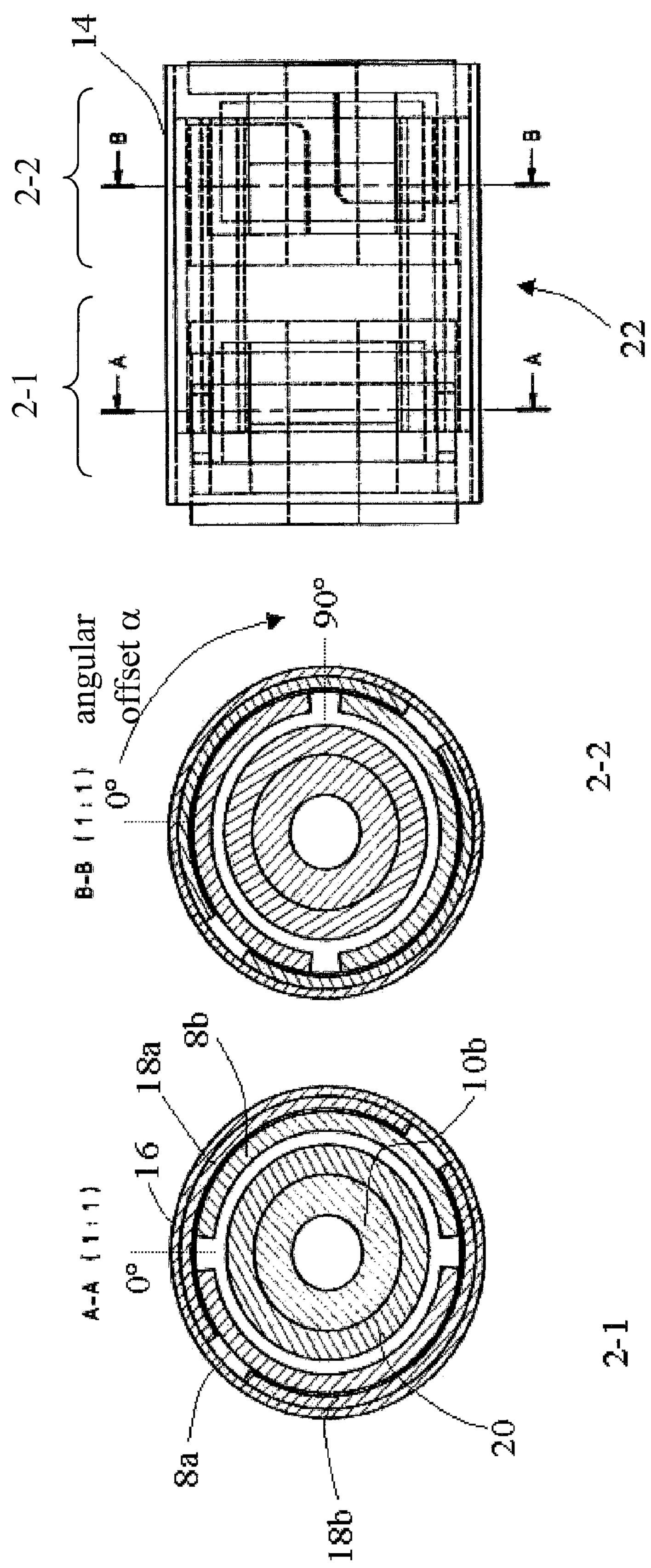
FIG. 4 is a lateral view and two sectional views of the motor of FIG. 2.

On the right, FIG. 4 shows a side view of the motor 22 perpendicularly to the rotational axis and the sectional planes for the representation A-A and B-B. The section A-A passes through the first stator module 2-1, while the second section B-B passes through the second stator module 2-2. As is apparent from the sectional views on the left side of FIG. 4, the pole teeth 8 of the first stator module 2-1 are angularly offset by 90° in circumferential direction to the pole teeth 8 of the second stator module 2-2. The magnetic flux lines from the exterior of the pole teeth 8 extend substantially radially outwards (or inwards—according to polarity), while the magnetic flux lines extend from the permanent magnets 18 substantially radially inwards (or outwards). According to polarity of the opposing permanent magnets 18 and pole teeth 8, the magnetic flux directions of the pole teeth 8 and of the permanent magnets 18 are identically directed or oriented (attracting force) or are opposed (repulsion), wherein in the latter case the magnetic flux lines are circumferentially or axially deflected in the gap. As mentioned above, on the rotor side, the magnetic closure is provided via the rotor material (rotor sleeve in the external rotor).

Figure 5:
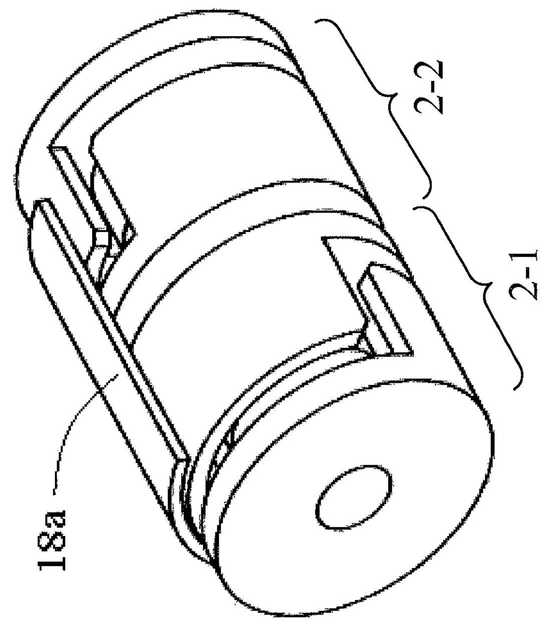
FIG. 5 is a perspective and a side view of two stator modules of the motor of FIG. 2 with one of the permanent magnets of the rotor.
Figure 5:
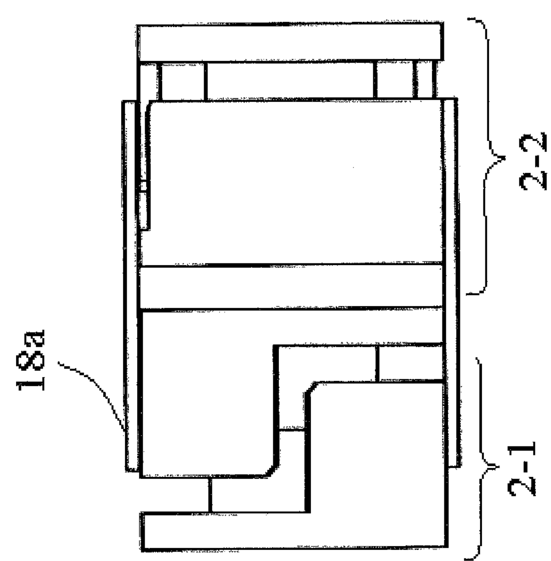

From the views of FIG. 5, the extension of one of the permanent magnets 18*a* along the entire axial depth of the two stator modules 2-1, 2-2 axially offset in succession is apparent. Entire axial depth means, as illustrated, the magnetically active depth with respect to the pole teeth from the center region to the axial ends of the motor 22.

Figure 6:
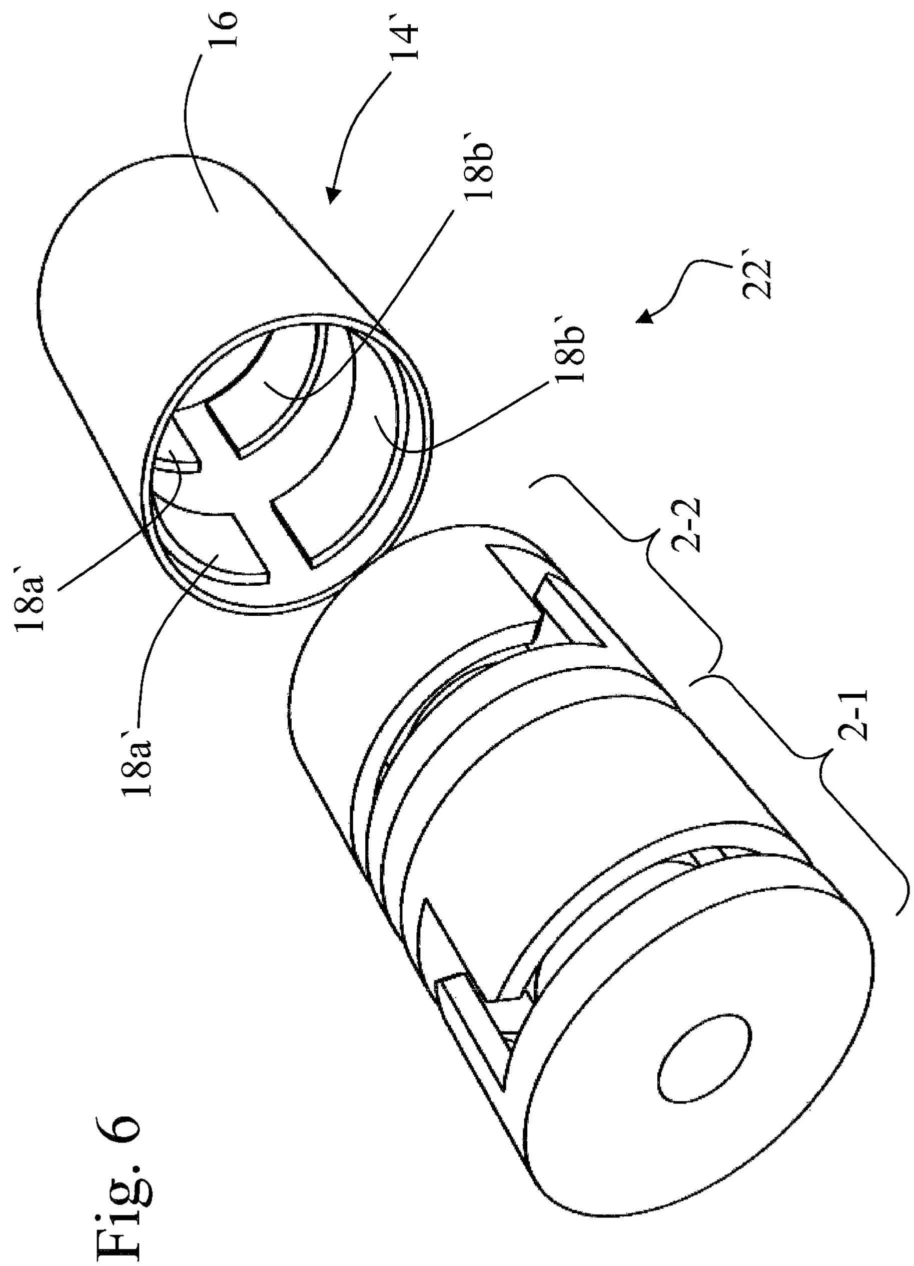
FIG. 6 is a perspective view of an electric motor with an alternative configuration of the permanent magnets.

FIG. 6 shows an embodiment of the electric motor 22 of FIG. 3 as an electric motor 22'. The difference is that in the embodiment of FIG. 6 the permanent magnets 18*a'* and 18*b'* are not formed continuously in axial direction on the inner circumference of the rotor 14' in the rotor sleeve 16, but only extend in the region of the respective axial extension of the pole teeth 8 of the respective stator module 2-1 or 2-2.

Figure 7:
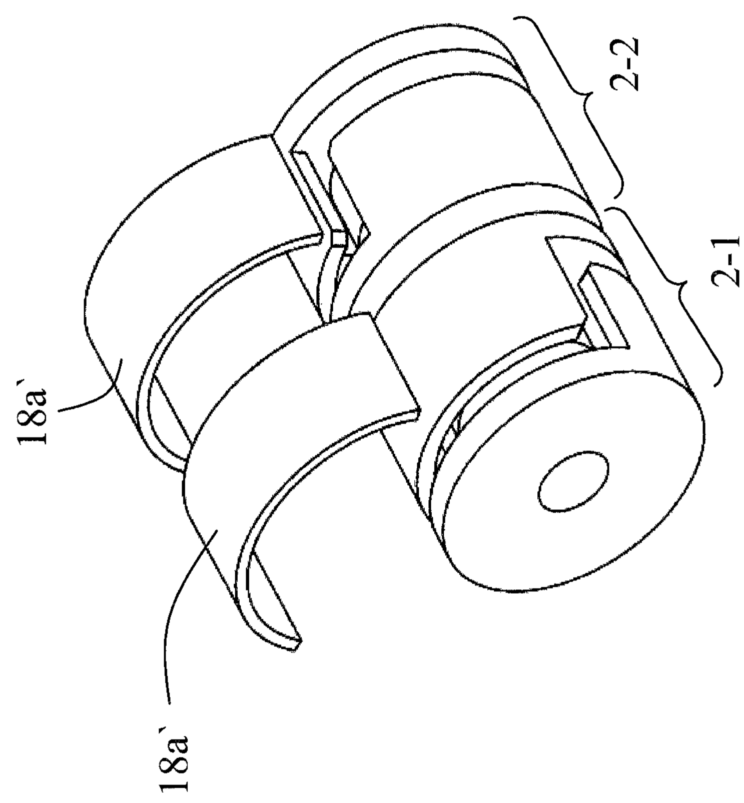
FIG. 7 is a perspective view of the stator modules with the exemplarily illustrated permanent magnets of the motor of FIG. 6.

In comparison with FIG. 5, FIG. 7 illustrates the assembly of two permanent magnets 18*a'* disposed offset to each other in axial direction in an open representation without rotor sleeve (the magnets 18*b'* are not illustrated for clarity) instead of the continuous permanent magnet 18*a*, wherein the same number of permanent magnets 18' as the number of pole teeth 8 per stator module is provided for each one of the stators 2-1, 2-2.

It is understood that in an embodiments of the electric motors 22', 50' and 80, respectively, instead of the angular offset between the pole teeth 8*a* of the two stator modules 2-1, 2-2, the permanent magnets associated with the respective stator module have the angular offset to each other, which otherwise the angularly offset stator module teeth have. I.e. 360°: (4×n), wherein n is half of the number of pole teeth 8 per stator module 2. The invention can also be implemented by a mixed form in which the angular offset of the rotor magnets associated with the stator modules and the angular offset of the pole teeth of the two stator modules calculated together result in the angular offset of 360°: (4×n).

Figure 8:
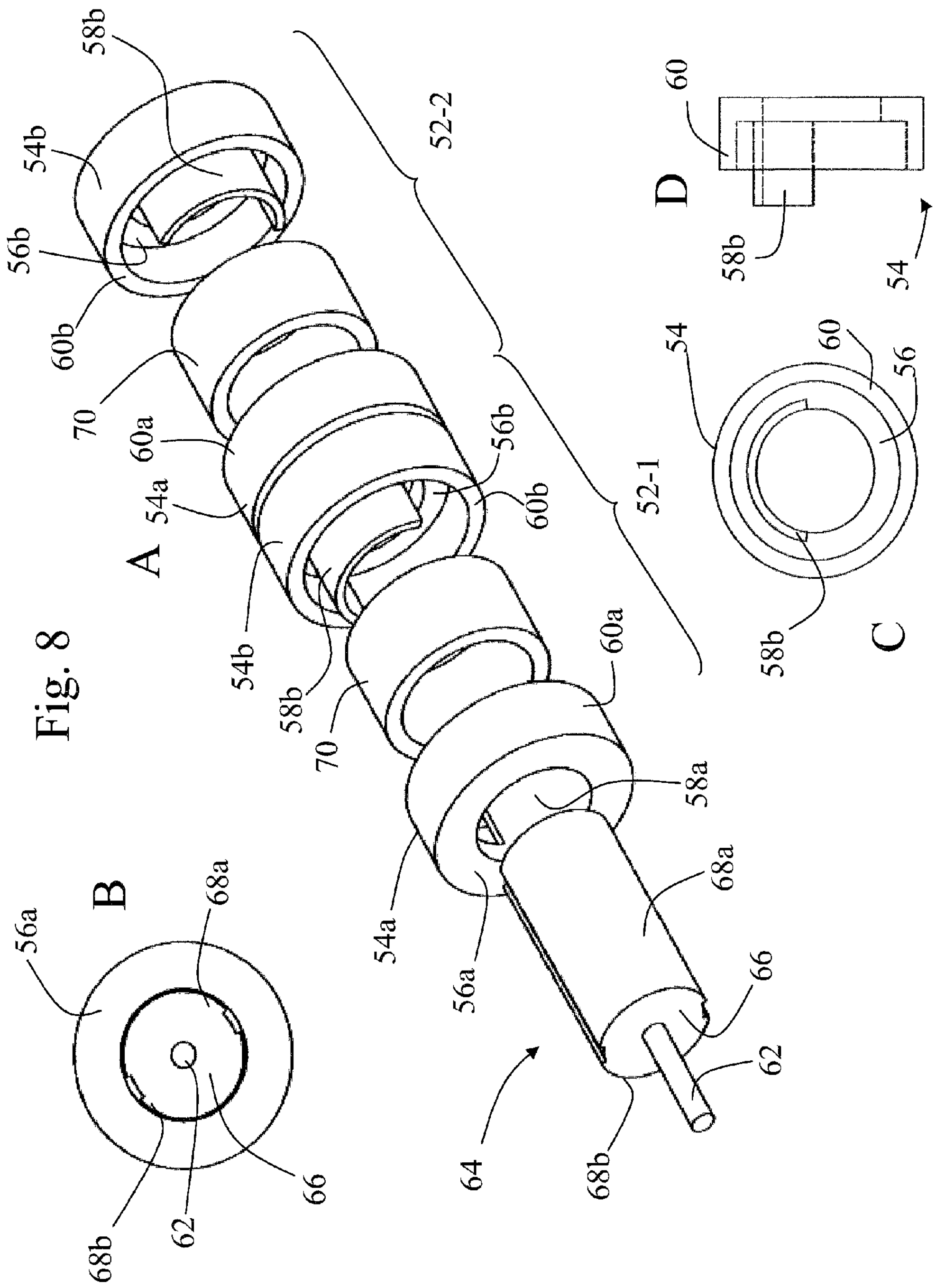
FIG. 8 is a perspective, exploded illustration of an electric motor formed as an internal rotor with two stator modules.

FIG. 8 shows a perspective, exploded representation of an electric motor 50 formed as an internal rotor. The stator modules 52-1 and 52-2 are disposed axially offset in succession, wherein each stator module 52 is composed of two partial shells 54*a* and 54*b*. The shell bottom 56 of a partial shell 54 in turn is formed as an annular disk, wherein here the internal hole is formed larger with respect to the external rotor in order to receive the internally located rotor 64. The pole teeth 58 extending in axial direction are disposed on the inner circumference of the shell bottom 56. To the exterior of the shell bottom 56, an external sleeve 60 is attached, wherein a continuous external sleeve is formed per stator module 52 with assembled partial shells 54*a*, 54*b*. As in the external rotor, advantageously, the external sleeves 60*a*, 60*b* of the two partial shells 54*a*, 54*b* are equally high, such that the partial shells 54 can be formed as identical parts. In modification, the external sleeves 60 can have different heights or even only one of the partial shells 54 can be provided with an external sleeve extending up to the shell bottom of the opposing partial shell.

The rotor 64 is supported on a shaft 62. A rotor cylinder 66 of the rotor 64 extends along the axial depth of all of the stator modules 52-1, 52-2, which are two stator modules in the illustrated embodiment. In an embodiment, instead of two three or more stator modules can also be provided offset in axial direction, wherein the rotor cylinder 66 then extends along the axial depth of all of the stator modules 52. The rotor cylinder 66 can be formed as an axial magnet, which has the two magnetic poles on the outside. Or, formed as a cylinder or hollow shaft, it can receive the magnets on the circumference and short-circuits the magnetic flux between the inwards directed poles due to the magnetic conductivity.

On the outer circumference of the rotor cylinder 66, two axially extending permanent magnets 68*a*, 68*b* with magnetic field substantially directed in radial direction are disposed, wherein the one permanent magnet 68*a* for example forms a south pole to the outside, while the other permanent magnet 68*b* forms a north pole to the outside. If more than two poles are formed on the stator, then more than two permanent magnets 68 are also provided on the rotor cylinder circumference, wherein the number of the pole teeth of a stator module is preferably identical to the number of the permanent magnets 68. The number of permanent magnets and pole teeth per stator module is a multiple of two such that alternating orientation of polarities of the permanent magnets 68 or of the pole teeth 58 and the magnetization is always achieved in circumferential direction. In this embodiment as well as in the other embodiments described here, the permanent magnets are disposed on the outer circumference (internal rotor) or inner circumference (external rotor) such that only a slight gap is present between the magnets, thus the degree of coverage on the circumference of the rotor with permanent magnets is close to 100%, for example at 90% or 95%.

As in the external rotor, in the internal rotor, an annular coil 70 is also received between the partial shells 54 of each stator module 52. Here, the same applies as in the external rotor with respect to the encompassment of the annular coil 70 (also in corresponding embodiments), with the difference that the pole teeth 58 here are located on the inner circumference instead of the outer circumference as the pole teeth 8 of the external rotor.

Figure 9:
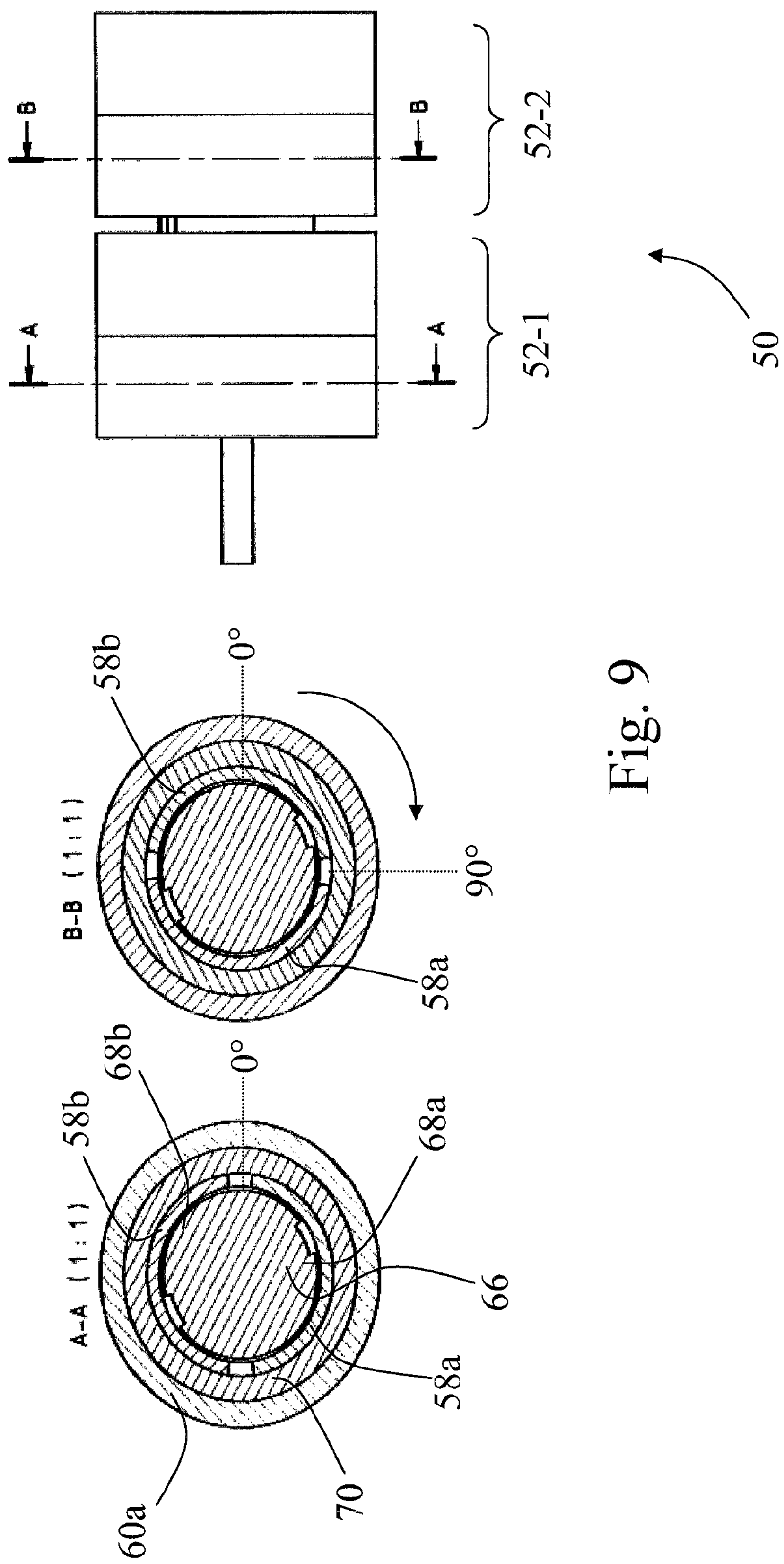
FIG. 9 is a lateral view and two associated sectional views of the motor formed as an internal rotor of FIG. 8.

FIG. 9 shows a side view of the motor 50 perpendicularly to the rotational axis, wherein the two cross-sectional representations represent the corresponding sectional area A-A and B-B. As is apparent in comparing the two sectional planes, here too, the pole teeth 58 of the two stator modules 52-1, 52-2 are angularly offset to each other by 90°. In this embodiment, the permanent magnets 68 extend along the entire axial depth of the two stator modules 52 without angular offset.

Figure 10:
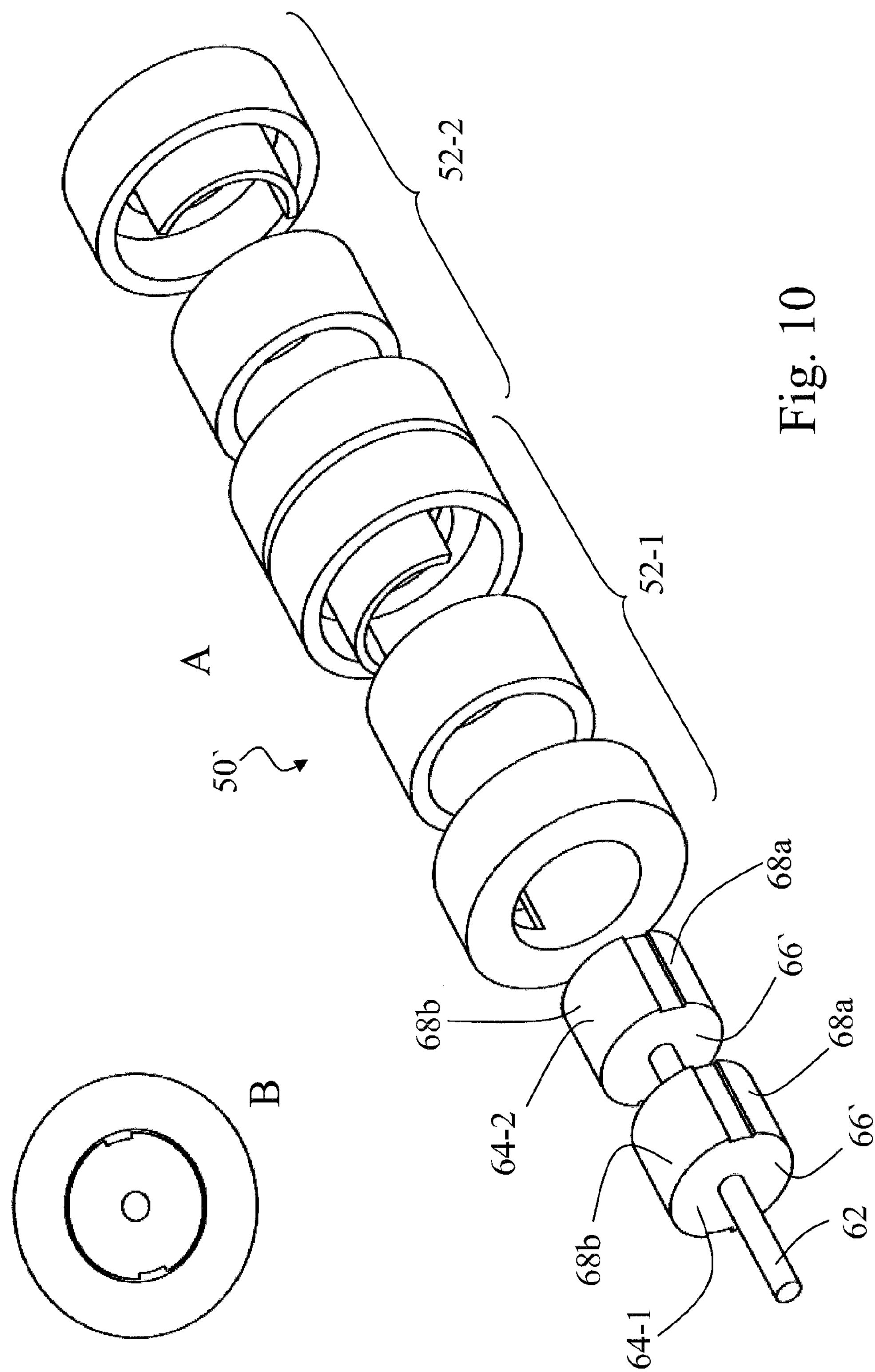
FIG. 10 is a perspective, exploded representation of a further embodiment of an electric motor formed as an internal rotor with a rotor composed of two rotor cylinders.

FIG. 10 shows a perspective, exploded illustration of a further embodiment of a motor 50' formed as an internal rotor with two stator modules 52-1 and 52-2. The stator modules are identically constructed as in the example illustrated in FIG. 8. Here, the difference is in that two rotor cylinders 66' are provided separated from each other on the shaft 62, which each bear two permanent magnets 68*a* and 68*b* on their outside. Thus, the difference to FIG. 8 is in that the rotor cylinders and permanent magnets 68 do not extend along the entire axial depth of the two stator modules 52-1 and 52-2, but only along the axial depth of the respective stator module, respectively. As already mentioned above, instead of the angular offset between the stator modules 52-1, 52-2, with separated rotor cylinders 66 or actually separated permanent magnets 68, the angular offset can be present between the permanent magnets 68 of the two rotor cylinders instead of between the pole teeth of two stator modules 52. As a further alternative, the angular offset of 360°: (4×n) can be composed of the addition of the angular offset between the permanent magnets of two rotor cylinders and the two stator modules 52.

FIG. 11 shows a further embodiment of an electric motor 80 formed as an external rotor and in which each stator module 82-1, 82-2 has 8 pole teeth 88 in total instead of two pole teeth (compare e.g. FIG. 1). Each partial shell 84*a*, 84*b* has four pole teeth 88*a* and 88*b*, respectively, extending in axial direction beginning on the shell bottom 86*a*, 86*b* on the outer circumference. The internal sleeve 90 beginning on the inner circumference of the shell bottom 86 is here in turn formed extending along the half of the distance between the shell bottoms 86*a*, 86*b* in each partial shell 84*a*, 84*b*. The embodiments of the internal sleeve 90 present in connection with the above described external rotor are applicable, here too. The stator modules 82-1, 82-2 are supported on a rigid shaft (not shown), which is inserted into the shaft hole 92. Corresponding to the number of pole teeth 88 per stator module 82, a corresponding number of permanent magnets 98 are provided on the interior of a rotor cylinder 96 of the rotor 94 (in this example eight pieces with polarity circumferentially alternating from permanent magnet to permanent magnet, wherein the polarity extends in radial direction). In the embodiment of FIG. 11, eight permanent magnets 98 are respectively provided for each stator module 82-1, 82-2, which are disposed offset to each other in axial direction, but are radially aligned with each other without angular offset.

Figure 12:
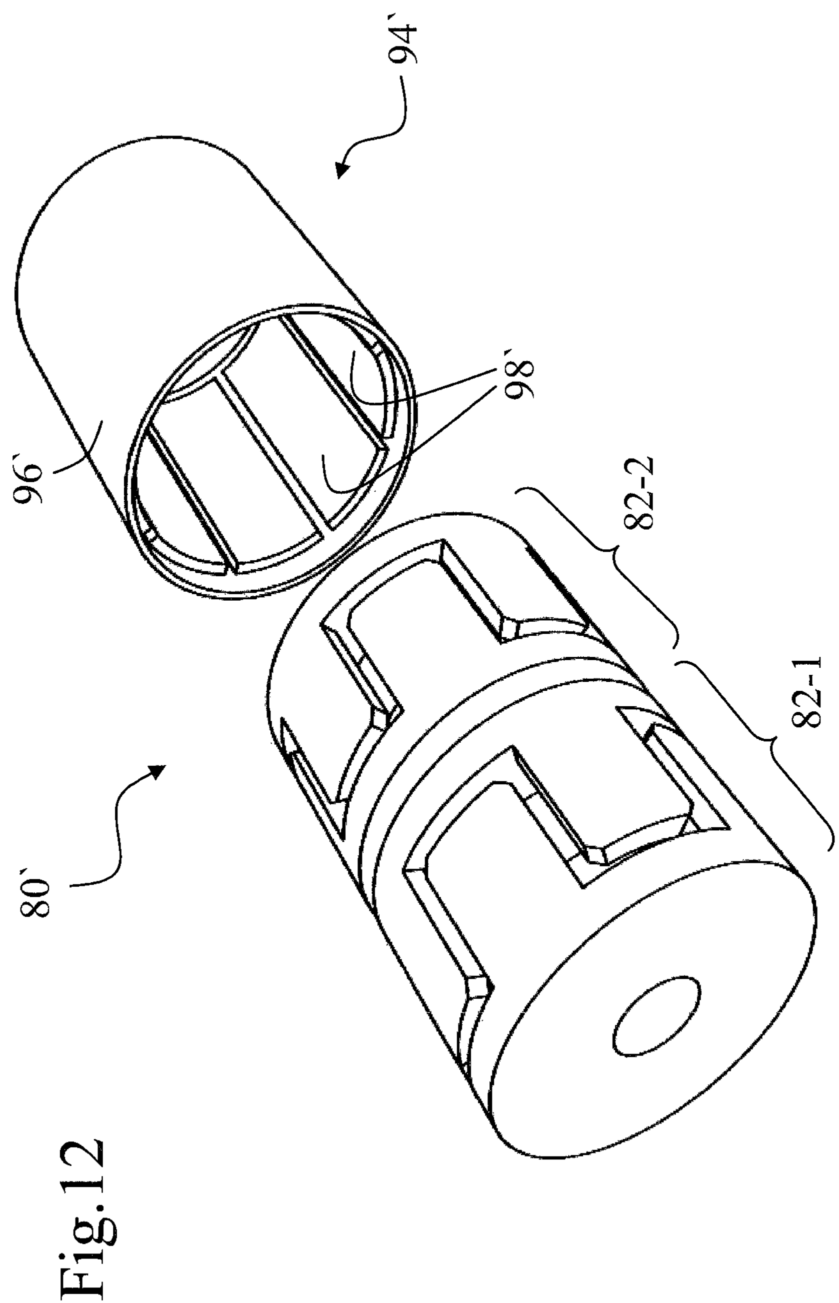
FIG. 12 illustrates a further embodiment of an electric motor with 8 poles per stator, in which the permanent magnets of the rotor extend along the axial depth of the two stators.

In the embodiment illustrated in FIG. 12, the stator modules 82-1 and 82-2 are identically configured (and each illustrated without annular coil), however, the permanent magnets 98 are formed continuously along the axial depth of the two stator modules 82 on the inner circumference of the rotor cylinder 96'.

FIG. 13 shows an embodiment of a partial shell 4, which can be employed in the above embodiments of the partial shells 4, 54, 84 and in which the partial shell is composed of thin sheets. In FIG. 13, the partial shell of an external rotor is illustrated, however, the construction and manufacture can also be transferred to the construction and manufacture of a partial shell (e.g. 54) of an internal rotor.

Figure 13B:
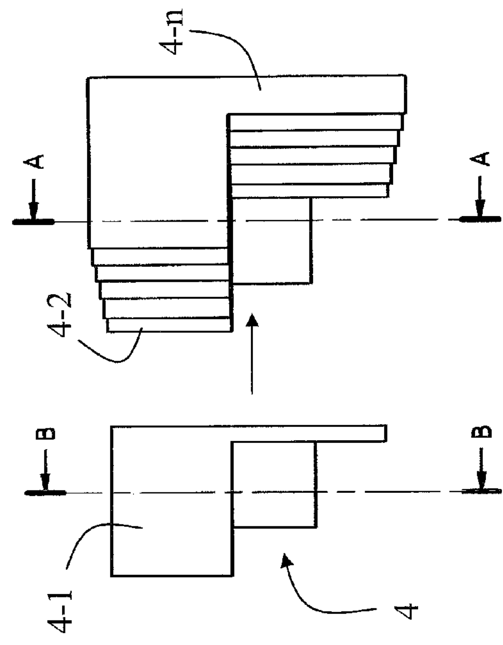
FIG. 13 illustrates the construction of a partial shell of an external rotor of thin sheet shells.
Figure 13D:
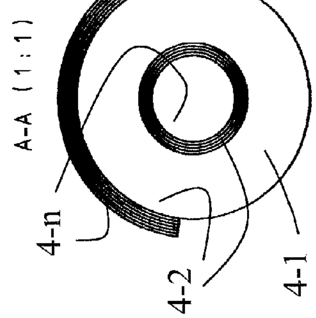
Figure 13C:
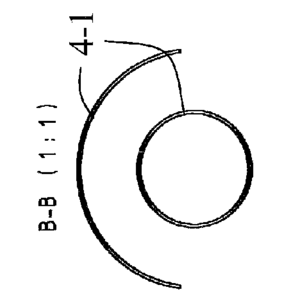
Figure 13A:
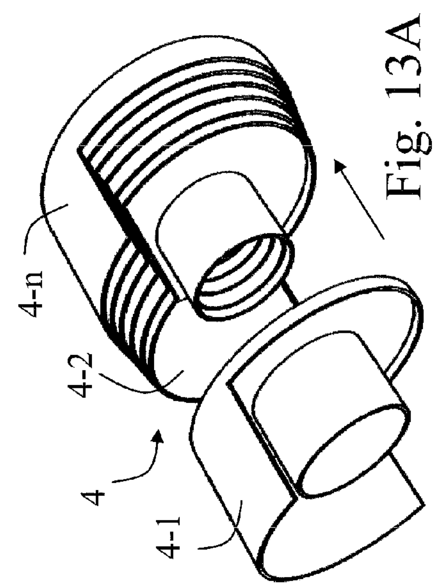
Figure 13E:
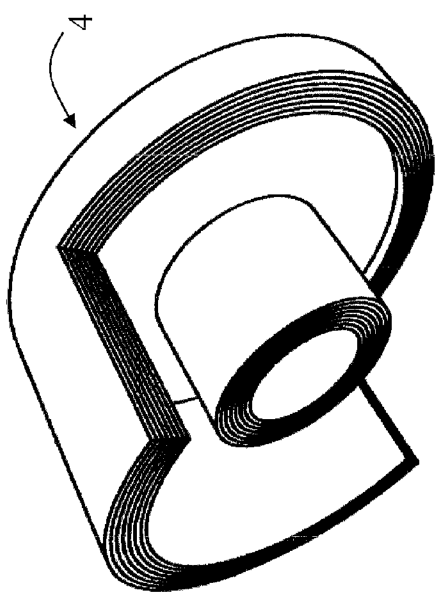

FIGS. 13A and 13B illustrate how a partial shell 4 is composed by stacking thin, preformed partial shell layers 4-1 to 4-*n* on top of each other. In the illustration, the partial layers 4-2 to 4-*n* are already stacked on top of each other, and the last partial layer 4-1 is applied on top of this stack, as indicated by the arrow. FIGS. 13C and 13D show the sectional planes A-A and B-B of FIG. 13B. As is apparent from FIGS. 13A and 13B, by stacking, a stepwise offset of the axial front edges of the pole tooth 8, of the internal sleeve 10 and on the circumference of the shell bottom 6 (cf. FIG. 1) results. By post-processing, the step offset is eliminated such that the partial shell 4 smoothed in FIG. 13E for further use in the above embodiments arises. The post-processing can be effected by cropping, sawing, turning, water-jet cutting or laser cutting.

The partial layers 4-1 to 4-*n* to be set on top of each other are produced from thin sheets by shaping or forging. The sheets are coated with an electrically insulating material on one side or both sides before or after shaping or forging, in order to suppress or largely suppress eddy currents in the partial shells 4, 54 or 84 that will be excited upon magnetic field variations. The insulating material can be a varnish coating, an oxide coating (e.g. $Al_2O_3$), a diamond-like coating (DLC) or the like. The "coating" can also be effected by material conversion of the sheet material (e.g. doping, nitration, siliconization or oxidation). Therein, the one side of the sheet or of a partial layer can also be coated with an insulating material differing from the material of the other side.

Alternatively, a partial shell 4 is formed from stacked sheets in that an originally flat sheet stack with the above described insulating coatings is formed in a shaping process such that the partial layers 4-1 to 4-*n* do not have to be individually assembled.

In the above illustrated embodiments, the finished partial or half shells of the stator modules can be adhered, soldered or welded to each other. Between each two adjoining stator modules, an air gap is present, wherein the stator modules are then supported on a common shaft or rigid axle spaced from each other (external rotor). Or the stator modules are kept spaced from each other by means of a mount (internal rotor). With spaced stator modules, the gap between the stator modules can also be filled with a diamagnetic material or magnetically non-active material.

The above described stator modules are constructed in the form of a claw stator. Each of the claw half shells is provided with stator teeth and stator projections, which mesh with each other upon mutual assembly. The stator teeth are magnetically separated from each other to the greatest extent by an interval (air gap). In case of an external rotor, the magnetic flux generated by the electric current in the coil is axially passed along the coil receptacle (axle yoke), then passed to the magnets of the rotor via the base plate or the shell bottom of the claw half shells and via the teeth. Herein, the teeth of the claw half shells constitute the stator poles. According to current flow through the coil, the magnetic flux generates the magnetic poles (e.g. south poles) in the teeth of the one claw half shell, the magnetic opposite poles (e.g. north poles) in the teeth of the other claw half shell. Upon alteration of the current direction, the magnetic poles of the stator teeth also alter. In the internal rotor stator, the claw rim takes over the magnetic return for closing the magnetic circuit, in the external rotor stator the axle yoke takes it over. These support elements of the claw half shells are placed directly on each other without air gap and can here e.g. be adhered or otherwise mechanically connected.

The internal space of the thus intermeshed claw rotor half shells receives the axially wound stator winding or coil. The winding of it is formed as a single winding, thus as a coil, and can be wound both with lacquered wire and with flat ribbon.

Also in this construction, as described in the patent specification "Elektrische Maschine", EP 1 708 338 A1, two of these stators designed in new construction are positioned offset in the angle of stator pole number/2 in order to allow controlled rotation of the rotor. In this claw construction of the stators it is possible to reduce the stator tooth number of each stator to the number of two. Therein, each claw half shell only bears or supports a single stator tooth. Two of these claw rotor half shells are correspondingly axially offset in the angle of 90 degrees (angle of stator number/2), e.g. in the case of two stator teeth per stator, upon assembly.

Advantages of the above presented construction of all of the embodiments are first a 100% copper utilization of the stator winding with simplest winding technique. Secondly, a low number of stator teeth results in lower switching and eddy current losses by the lower exciting current frequency. Thirdly, the magnetic fields of the two stators offset in succession in the pole tooth angle/2 are passed to the individual windings without major stray fields. The stray fields between the teeth are minimized by the low number of teeth. Fourthly, it is very simple to position the claw stators in succession and to adhere them to each other.

The claw rotor half shells 4, 54, 84 can for example be manufactured of sintered ferrites (iron oxide hematite $Fe_2O_3$) or of iron powder composites (powder core) based on iron powder or powder alloys, by sintering, pressing or casting.

A motor 22, 22', 50, 50', 80, 80' of this construction can be controllably operated with the aid of corresponding electronics with bridge transistor circuit and sensor system for identifying the magnet position and with pulse width control or with the aid of frequency conversion with two phases having phase shift adapted to the stator pole tooth offset, by varying the frequency and varying the alternating current level. For example, as it is described in EP 1 708 338 A1 or in FIGS. 33 to 38 (some previously described in EP 1 708 338 A1).

Due to the lower exciting current frequency by the low pole number of these motors, the formation of the stator partial shells is also conceivable in the form of a forged soft iron core from solid material. However, in order to keep the eddy current losses low, preferably, as above described, the stator partial shells are assembled of individual forged partial segments in the form of individual sheet shells 4-1 to **4-*n* of electric sheet, which are inserted into each other and then yield the desired stator partial shell as a whole. They are provided with a thin electrically non-conductive insulating layer before or after sheet formation in order to minimize the undesired eddy current losses. The individual sheet shells 4-1 to 4-*n* can be adhered to each other and/or welded at the external joints. The recesses for the poles can be stamped out, lasered before the forging operation or milled out collectively after the forging operation or recessed and smoothed in manifold other manner. The sheet thickness of the individual sheet shells 4-1 to 4-*n*** should be between 0.3 mm and 2.0 mm according to size of the motor.

Figures 14, 15, 16, 17:
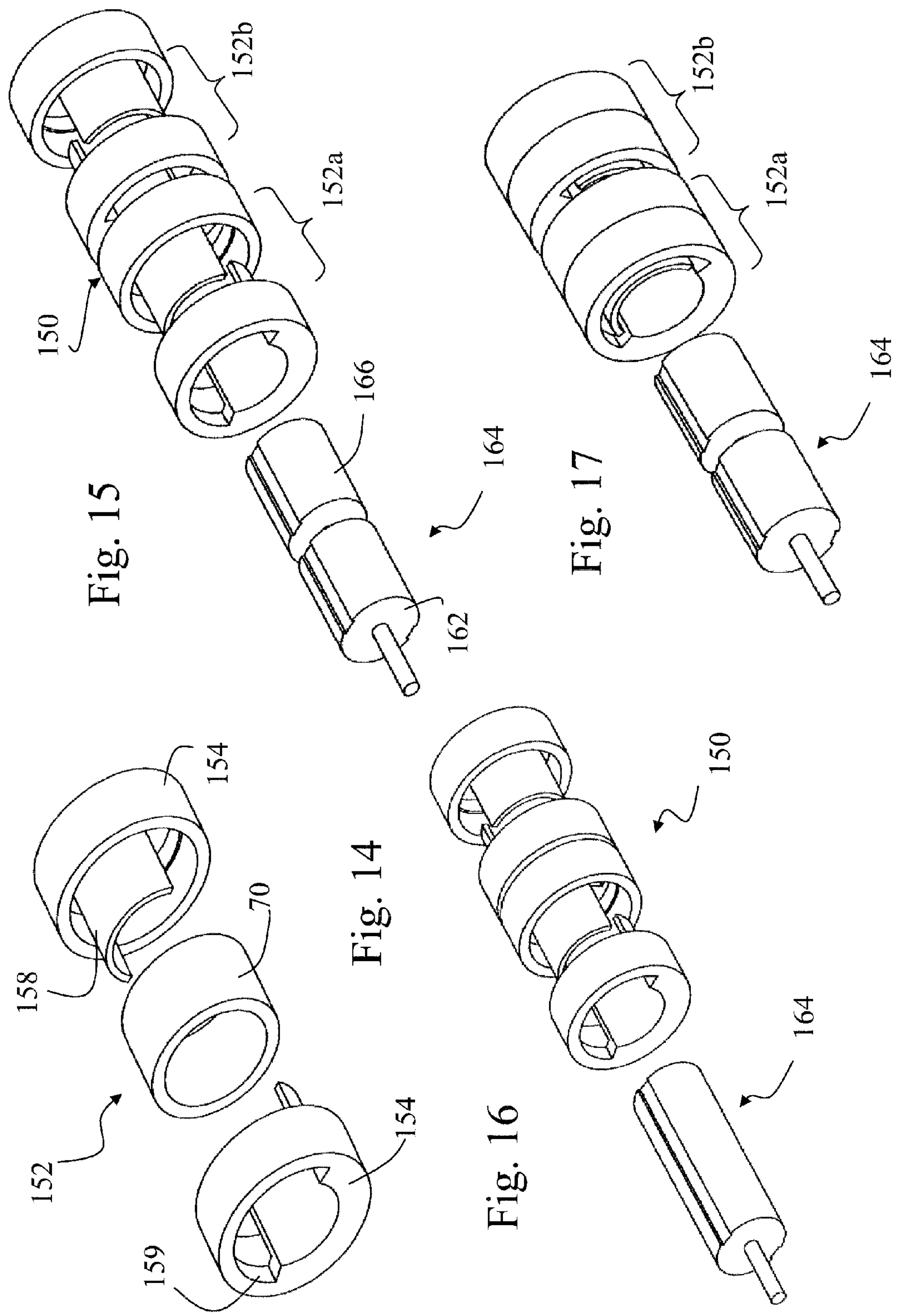
FIG. 14 is a perspective, exploded representation of a further embodiment, in which the pole teeth extend across the entire depth of an internal rotor stator module.
FIG. 15 is a perspective, exploded representation of a motor with internal rotor and two stator modules according to FIG. 14.
FIG. 16 illustrates a motor as in FIG. 15, but with a continuous internal rotor.
FIG. 17 illustrates a motor as in FIG. 15, but with assembled stator modules.

FIG. 14 shows a perspective, exploded representation of a further embodiment of an internal rotor stator module 152 (cf. FIG. 8) with each one pole tooth 158, in which the pole teeth 158 extend along the entire depth of the internal rotor stator module 152. In the paired partial shells 154, the pole teeth extend up to a mating tooth recess 159 of the respectively opposing partial shell. The front edge of the tooth engaging with the recess preferably ends flush with the outer shell bottom surface of the partial shell. In this construction, the full depth of a stator module 152 is utilized in order to magnetically interact with the permanent magnets on the interior surface of a pole tooth 158. Besides increased (larger area) utilization of the magnetic flux, more compact construction also takes effect.

Figure 18:
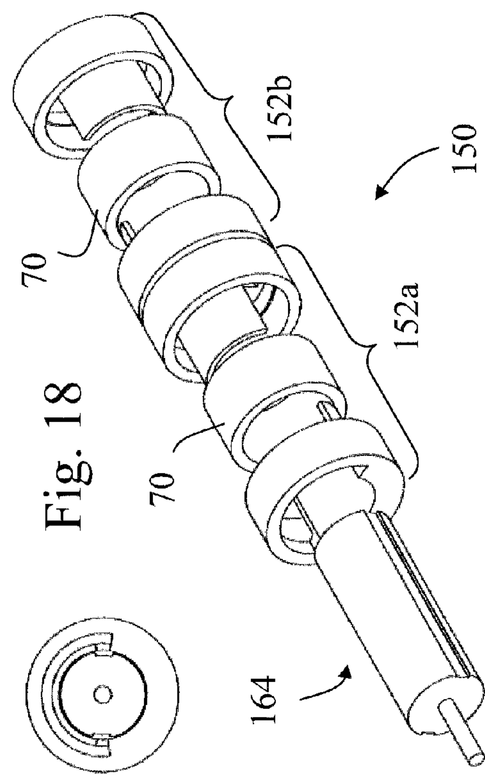
FIG. 18 illustrates a motor as in FIG. 16—here with the annular coils depicted in the figure.

FIG. 15 shows the perspective, exploded illustration of a motor 150 with internal rotor 164 and two stator modules **152*a*, *b* as in FIG. 14 (annular coils 70 not shown). The rotor 164 is composed of two cylinders 166 supported on a shaft 162, at the exterior of which permanent magnets 168 are disposed (cf. FIG. 10). In FIG. 17, the motor 150 of FIG. 15 is illustrated with assembled stator modules. In FIG. 16, the motor of FIG. 15 is modified such that the internal rotor has a cylinder continuous along both stator modules 152*a*, *b* and continuous permanent magnets (cf. FIG. 8). FIG. 18 shows the motor 150 as in FIG. 16, here with annular coils 70** drawn in.

Figure 19:
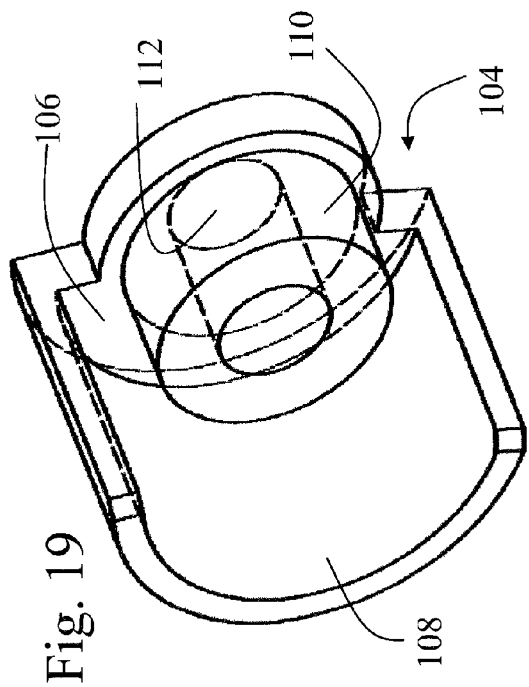
FIG. 19 illustrates a partial shell for an external rotor according to a further embodiment.
Figure 21:
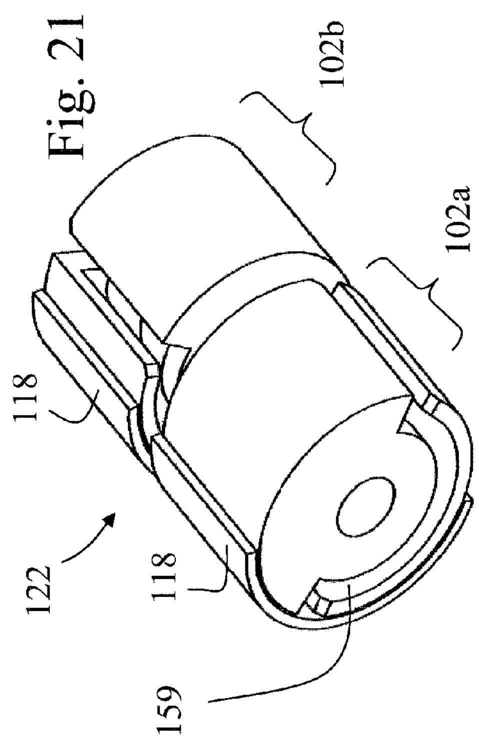
FIG. 21 illustrates a motor with stator modules as in FIG. 20 with semi-cylinder jacket shaped permanent magnets illustrated behind.
Figure 20:
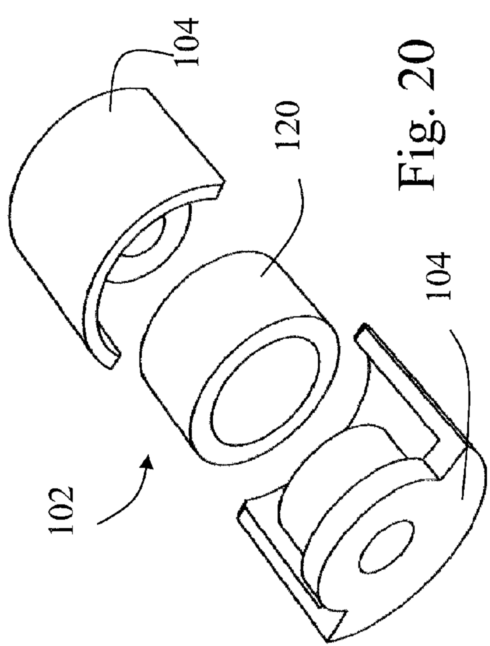
FIG. 20 illustrates a perspective, exploded representation of an external rotor stator module with partial shells as in FIG. 19.
Figures 22, 23, 24, 25, 26:
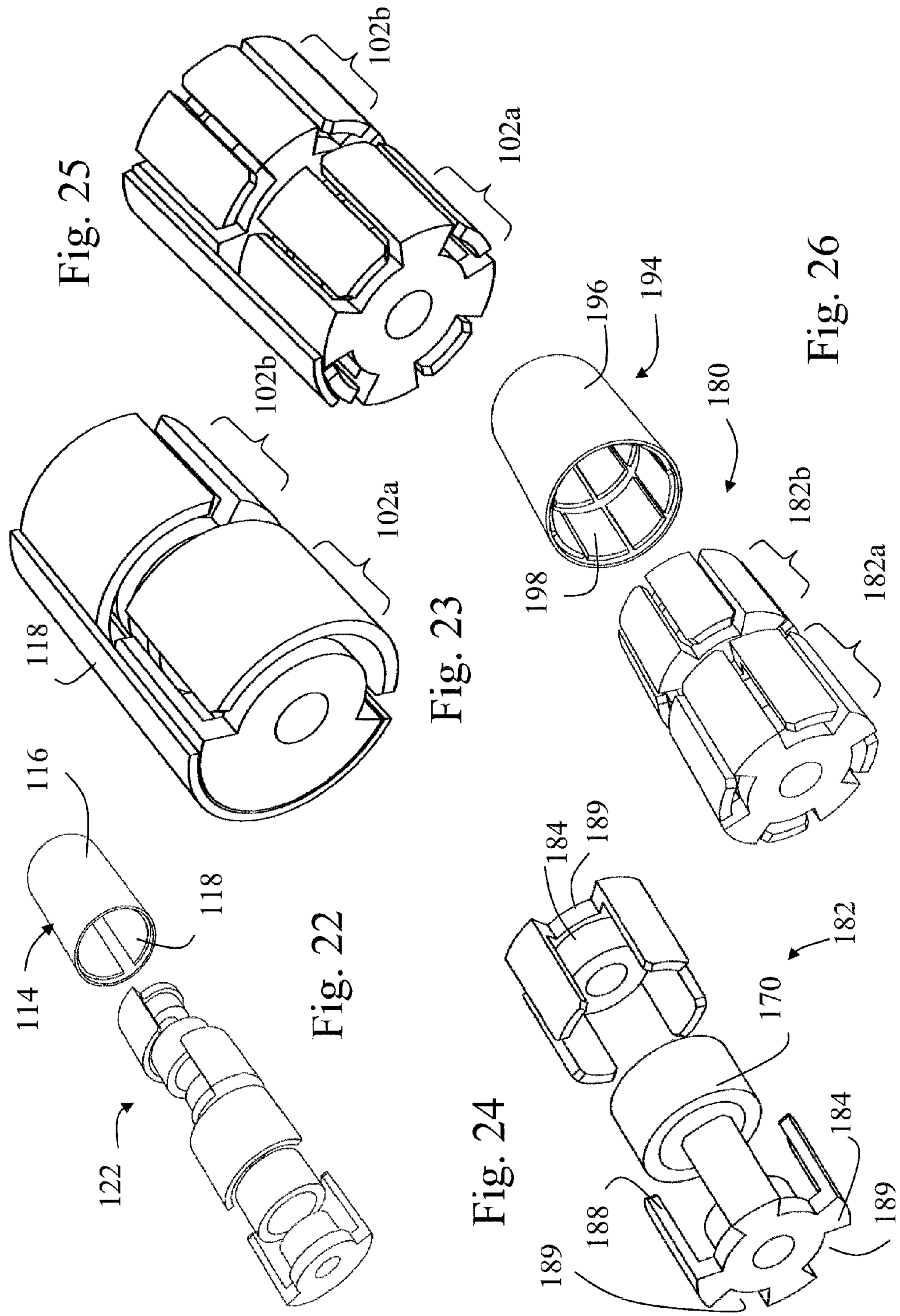
FIG. 22 illustrates a motor similar to FIG. 21 with external sleeve of the rotor and permanent magnets continuous over both stator modules.
FIG. 23 illustrates two assembled stators as from FIG. 20 with semi-cylinder jacket shaped permanent magnet.
FIG. 24 is a perspective, exploded representation of an external rotor stator module with partial shells with each four continuous pole teeth according to a further embodiment.
FIG. 25 is a motor with two assembled modules from FIG. 24 and a continuous partial cylinder jacket shaped permanent magnet.
FIG. 26 is a motor as in FIG. 25 with external sleeve and eight permanent magnets disposed on the inner circumference of the sleeve, wherein each axially only extend over the associated stator module.

FIG. 19 represents a partial shell 104 for an external rotor according to a further embodiment. An external rotor stator module 102 of two partial shells 104 of FIG. 19 and a coil 120 received in between is shown in FIG. 20 in perspective, exploded representation. From two stator modules 102 as in FIG. 20, there results the motor 122 (only partially represented) of FIG. 21, in which semi-cylinder jacket shaped permanent magnets 118 are each separately represented for the corresponding stator module section behind. FIG. 22 then shows the motor 122 similar to FIG. 21 with external sleeve 116 of the rotor 114 and permanent magnets 118 continuous along both stator modules. In FIG. 23, the two stator modules **102*a*, *b* (as individually illustrated in FIG. 20) are assembled and represented with semi-cylinder jacket shaped permanent magnet 118** continuous along both modules.

FIG. 24 shows a perspective, exploded illustration of an external rotor stator module 182 with partial shells 184 with each four continuous pole teeth 188 according to a further embodiment. As in the embodiments of FIGS. 14 to 23, starting from the shell bottom 186 of the one partial shell 184 the teeth 188 extend up to the mating tooth recess 189 of the opposing, paired partial shell, engage with the recess 189 thereof and there terminate preferably flush with the external shell bottom 186. FIG. 25 shows a motor 180 (partially—cf. FIG. 26) with two assembled modules **182*a*, *b* of FIG. 24 and a continuous, partial cylinder jacket shaped permanent magnet 198. FIG. 26 shows the motor 180 as in FIG. 25 with external sleeve 196 of the rotor 194 and 2×8 permanent magnets 198 disposed on the inner circumference of the sleeve, axially extending only over the respectively associated stator module 182**.

Figure 27:
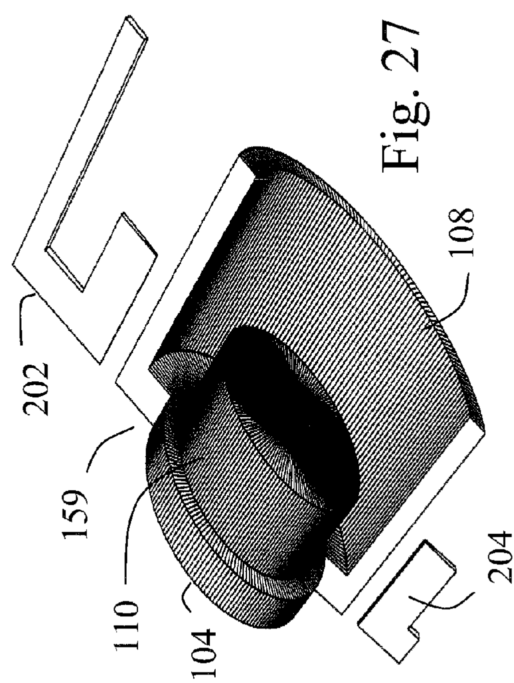
FIG. 27 illustrates an external rotor partial shell as in FIG. 19, wherein the partial shell is composed of radially extending wedges.

FIG. 27 shows an external rotor partial shell 104 as in FIG. 19, wherein the partial shell is composed of radially extending wedges 202, 204 (actually trapezoids, since the shaft hole is recessed in the center for supporting the partial shell). In this further variant, the eddy current losses in the shells 104 of the shell motor are reduced by the wedge-shaped transformer sheets 202, 204. The stator shell body is a stack of wedge-shaped transformer sheets 202, 204 annularly disposed around the rotational axis of the motor, which are trapezoidally formed in the thickness of the material. These individual sheet parts are e.g. formed of transformer sheet material or the like for constructing stator elements. In manufacture, the magnetically conductive sheet material is rolled in a rolling process in a defined angle. The angle is preferably 0.1-1.0 degree according to diameter of the stator element. The maximum thickness of the stator sheet parts is therein preferably not above 1 mm. The desired sheet shape is subsequently stamped out from the sheet strip such that with the desired angle, the desired maximum and minimum thickness of the stator sheet part also results in order to then be able to annularly stack them. They can also have different shapes to yield the preset overall shape of the shell stator half shell after the stacking process. The number, the thickness as well as the rolling angle of the stamped and previously or subsequently isolated individual sheets has to be selected such that the desired cylindrical shell body as a whole results. In the illustrated embodiment, they are two stacked sheet variants 202, 204, which have been employed for forming the stator half shell 104. It is stacked in a mold or a corresponding stacking tool. A small undersize of the sheets is advantageous since the sheets then can be better stacked and thereby will not jam upon assembly. The slight intervals between the sheets (ca. 0.01-0.05 mm) can then be compensated for by resins or varnishes, e.g. in vacuum impregnating, and are thereby cast to a part at the same time. In addition, the sheet packages 202, 204 can be welded to each other at the front sides.

Figure 28:
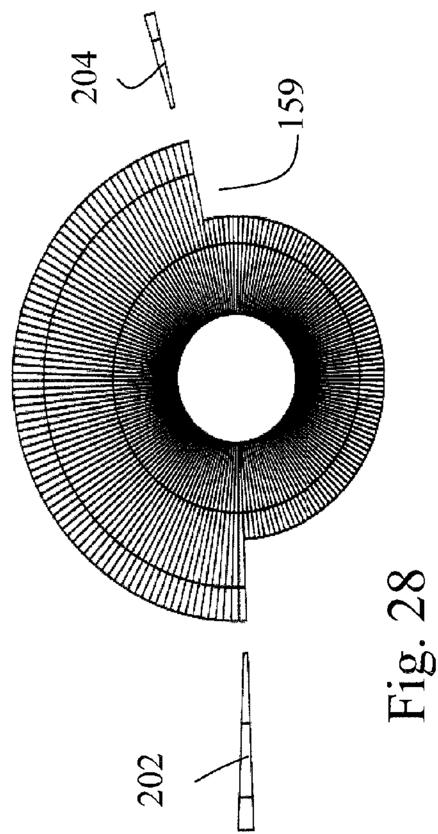
FIG. 28 is an axial inside view of the partial shell of FIG. 27.
Figure 29:
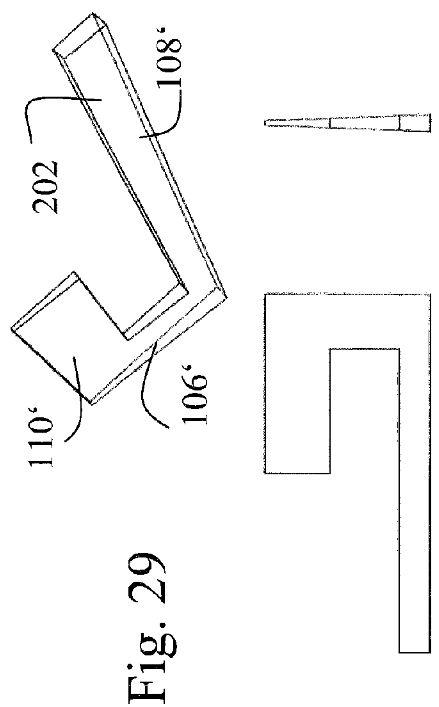
FIG. 29 illustrates various views of a radial wedge from the region of the stator tooth of FIG. 27.

FIG. 28 shows an interior view of the partial shell of FIG. 27—viewed from axial direction along the rotational axis (with respect to the axial viewing direction after assembling the motor). FIG. 29 shows various views of a radial wedge or transformer sheet 202 from the region of the stator tooth of FIGS. 27 and 28. The long leg on the asymmetrically U-shaped wedge 202 constitutes a narrow circular arc section 108' of the pole tooth 108. The short leg constitutes an annular arc section 110' of the internal sleeve 110. The later shell bottom 106 is formed of the annular arc section 106'. The described shapes (annular or circular arc section shaped) relate to the cross-section perpendicular to the rotational axis of the assembled motor.

Figure 30:
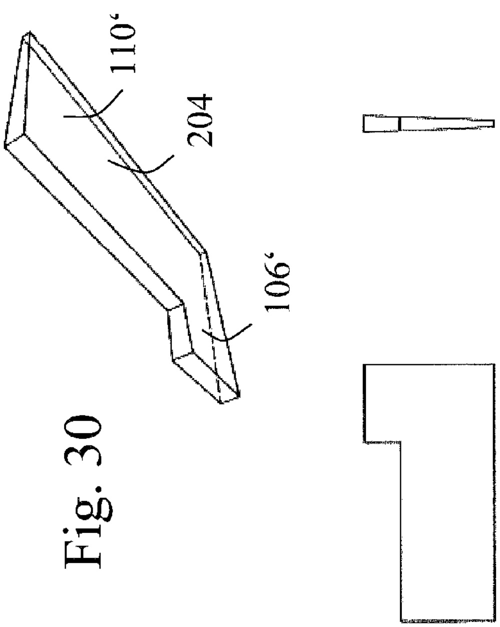
FIG. 30 illustrates various views of a radial wedge from the region of the mating stator tooth receptacle of FIG. 27.

FIG. 30 shows various views of a radial wedge 204 from the region of the mating stator tooth receptacle of the partial shell of FIG. 27. In the L-shaped wedge 204, the long leg constitutes the annular arc section 110' of the internal sleeve 110 and the short leg constitutes the annular arc section 106' of the shell bottom 106. In order to improve the visibility in FIGS. 29 and 30, the maximum thickness of the sheets was represented slightly thicker (scaled by about the factor of 2).

FIG. 31 shows an external rotor stator partial shell 104 in further embodiment of the partial shell 4 of FIG. 13A-13D, however with the recess 159 for receiving the mating stator tooth. FIG. 32 shows the stator partial shell with the mating stator tooth recess 159 of FIG. 31 after leveling the edges corresponding to FIG. 13E. With respect to the composition of stator sheets and smoothing at the edges, reference is made to the description of FIG. 13A to 13E.

Operation of the Electrical Machine

In the following the operation of the electrical machine is described using an embodiment in which the motor (and/or generator) is composed of two stator modules. A 'stator module' is a stator of the multi-stator motor and the associated portion of the rotor. As mentioned, the rotor is a rotor common for all of the stators and may be formed unitary or may be composed of axial segments where one of the segments is assigned to and arranged at one of the stators.

In more detail the example for the operation is described for the external rotor type with the two modules 2-1 and 2-2 shown for example in above FIGS. 2 to 5. Without limitation the operation mode is applicable to any type (internal rotor type and external rotor type) and any shell construction (monolithic (e.g. FIG. 1), multilayer (e.g. FIG. 13), multi-ray or wedge (e.g. FIG. 27), with (FIG. 1) or without mating tooth recess 159 (e.g. FIG. 37)). The operation mode for two modules is easily expandable to motors and/or generators having more than two modules as indicated below. The following description is partially taken from EP 1 708 338 A1 (corresponding to US 2006 0 244 332 A1) and applied to the specific case of the present motor and/or generator in shell construction with a single coil or torus windings instead of serially connected tooth windings.

Figure 33A:
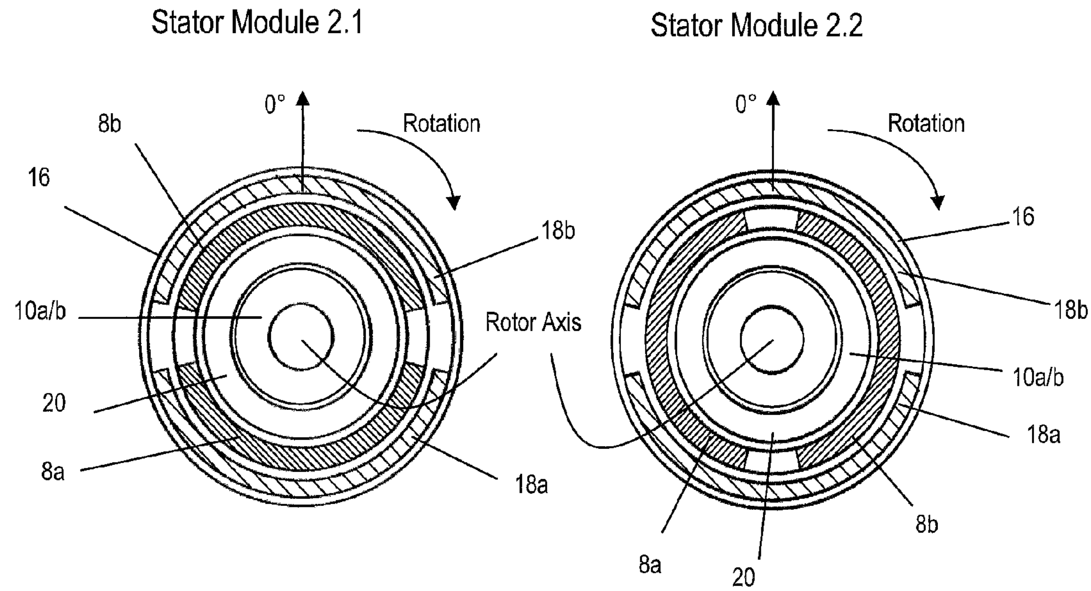
FIG. 33A is a cross section through the first and second stator module of the dual stator motor of FIG. 3 with winding (compare FIG. 4).
Figure 34:
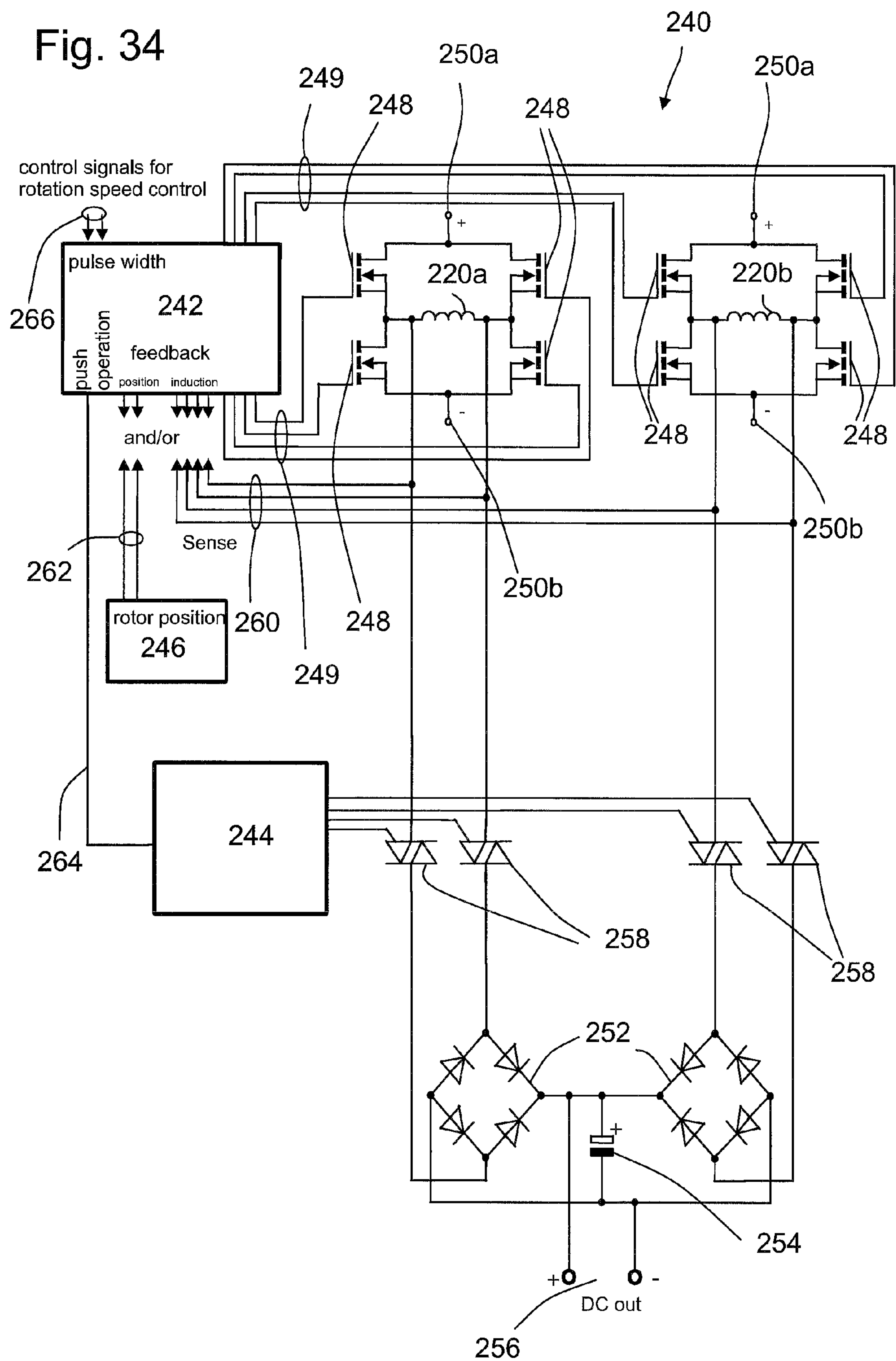
FIG. 34 is a block diagram of a motor unit when using the dual stator motor (e.g. of FIG. 3) as drive or actuation motor and generator in one configuration.

As indicated in FIG. 33A, the angular offset a of 90° in the azimuthal orientation between the stator modules 2-1 and 2-2 from the magnet pole center to the next magnet pole junction (that is half of the stator or pole tooth angular offset) results in time offset of the magnetic incidences. In module 2-1 the azimuthal center of pole tooth 8*b* and of magnet 18*b* are at 0° and in module 2-2 the azimuthal center of pole tooth 8*b* of this stator is at 90° in clockwise direction (rotor position and magnet position is the same as for module 2-1 as the rotor position at the same time is shown and the magnets 18*a* and 18*b* are collinear to the common axis without angular offset). Therefore it is possible to use the resulting different magnetic powers to generate a rotation. For this, according to a scheme as described in the following, the current directions or flows in the coil windings 20 of the respective stator modules 2-1. 2-2 are controlled alternatingly and reversed using a bridge circuit (see FIG. 34 showing a drive circuit 240). This results in a rotation in the desired direction, using the relative phasing of the coil excitation of the stator coils. When using two stators positioned in a row and each pole tooth 8*a/b* magnetized by the coil 20, this is basically comparable with the actuation with the help of pedals of a bicycle, wherein the first pedal is pushed and the second is pulled and vice versa. The magnetized pole teeth 8*a/b* push and pull the stators step by step into one direction. For this it is necessary to detect the position of the rotor magnets 18*a/b* by a sensor 246 or alternatively by measuring the induction voltages (sense lines 260) in the coils 20, generated when passing the magnet poles of the rotor 14.

The use of three or even a higher number of stators modules positioned axially in a row and having an angular offset as described before, results in even more connection possibilities of the stator coils like star circuit, delta connection etc. . . .

Figure 33B:
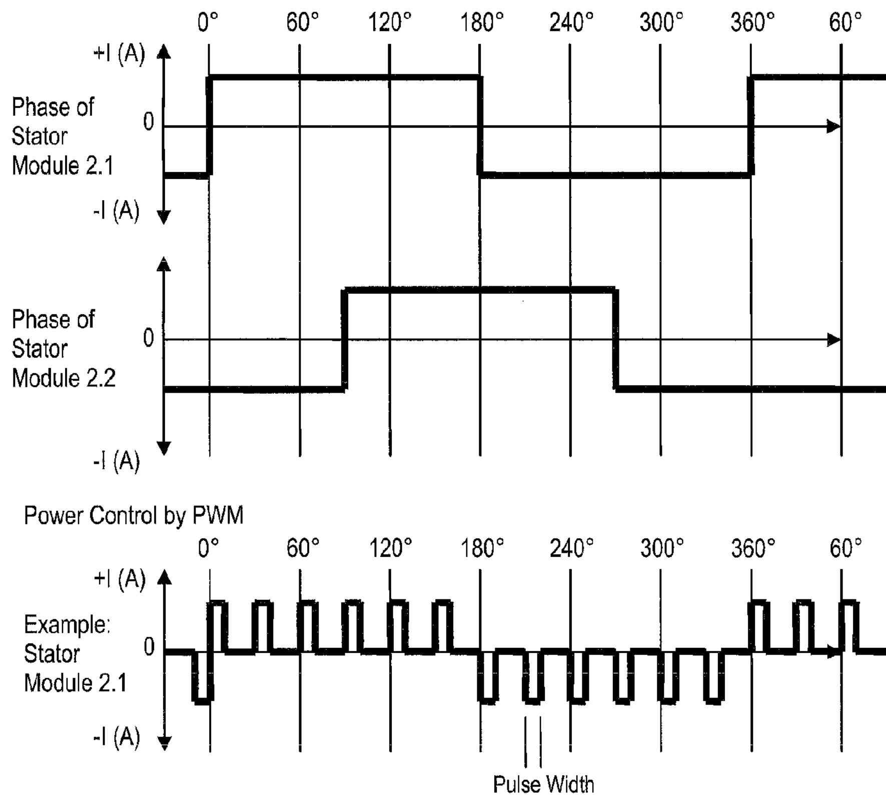
FIG. 33B is a current vs. time diagram including the rotation position for illustrating the magnet positions and the applied current during motor operation and when starting from FIG. 33A angular positions.

FIG. 33A shows in cross section the two modules 2-1 and 2-2 at one rotational position of the rotor 14 at time t=0 (compare cross sections A-A and B-B in FIG. 4) used here for explanation. FIG. 33B shows the temporal control of the current supplied to the coils of respective module 2-1 and 2-2 and the angular position of the rotor over time. The magnets 18*a/b* of the rotor 14 comprise no angular offset to each other in axial direction and continuously extend over both stators modules.

The diagram of the rotation in FIG. 33A shows the temporal behavior of the current phase of the voltage supplied to the coils 220*a*/220*b* in the first two time diagrams, wherein coil 220*a* is in module 2-1 and coil 220*b* is in module 2-2 (both shown as '20' in FIG. 33A). The third time diagram shows as an example the pulse-width modulated (PWM) current applied to the first coil 220*a* with the phase shown in the first time diagram of FIG. 33B. This illustrates that the power applied to the motor is controlled via the pulse width. Further the pulse widths depend on the rotation speed.

The respective currents shown in FIG. 33B are the currents supplied to the coils 220*a, b*, as for example supplied by the transistors 248 shown in FIG. 34. The result is a switching offset between the coils 220*a, b* which corresponds to the angular offset a of the stators (here 90°).

The above described design allows the operation of the electrical machine as generator as well as motor. It is therefore convenient to use this for example for vehicles as actuator as well as for energy recovery. Required for this is an electronic switching mechanism which for example switches from motor to generator operation during push operation of the vehicle. The momentum thus transformed into electrical energy can be feed back to the power battery or to an electricity network. Here the generator operation also has a braking effect which can be used for braking in a controlled manner.

FIG. 34 shows a block diagram of the motor drive unit 240 comprising a control unit for driving and energy recovery. If just a drive control is necessary, then the arrangement can be simplified by omitting the energy recovery section. The coils 220*a, b* of stator modules 2-1, 2-2 are commutated electronically by the motor drive unit 240. For each module or coil a bridge circuit is provided. The bridge circuits comprise each four power transistors or power FETs 248, as shown here. The FETs receive their gate signals via gate lines 249 connected to a controller 242. The battery voltage (for example when used as a vehicle motor) is applied to the terminals 250*a, b* at the FETs 248. Transistors 248 act as power switches and power MOSFETs or IGBTs (Insulated Gate Bipolar Transistors) may be used as or instead of FETs.

As feedback for detecting the rotor position, respectively the position of the magnet poles, two versions are shown. In one embodiment one or more hall sensors 246 or optical sensors are assigned to the magnets 18*a, b*, in order to detect the relative position of the rotor 14 relative to the stator modules 2-1, 2-2. The sensor signal is supplied to the controller 242 via sensor lines 262. According to another embodiment the induction voltage at the coil wires 220*a, b* is detected, which is particularly generated during the turning on and off operations. The induction voltage of both coil wires 220*a, b* is supplied to the controller 242 via the sense lines 260. In both embodiments of the position detecting, the start, the end, the speed as well as the polarity of each magnet can be detected. In the controller 242 these signals are detected and used to adjust the respective switch timing and possibly to correct the phase. Alternatively or additionally to the optical sensors, Hall sensors or induction sensors, for detecting the rotor position magnet field sensors. Normally such sensors detect a specific rotor position or several azimuthal positions of the motor and for correction to a reference position, like the position 0° shown in FIG. 33A, a predefined angle may be added or subtracted from the detected rotor position. In the case of a rotational symmetry of the rotor and stator—the preferred embodiment—a reference angle (e.g. 0°) can be set to an arbitrary one according to the number of rotational symmetry. In the embodiment shown in FIG. 33A the rotational is at 180° as the number of poles and magnets is 2.

It is the specific feature of this type of motor control and motor that the time point of switching the current phase applied to the motor is the time when the azimuthal center of a pole tooth 8*a*, 8*b* passes the azimuthal center of the magnet 18*a*, 18*b* in the respective module 2-1, 2-2. With respect to FIG. 33A, in module 2-1 the center of tooth 8*a* radially faces the center of magnet 18*a*, while the center of tooth 8*b* radially faces the center of magnet 18*b*. The rotation angle is 0° and the I-amplitude of module 2-1 has an amplitude change (corresponding to the phase change) at the 0° position which coincides here with t=0 for illustration purpose. In module 2-2 as shown in FIG. 33A, the center of pole 8*a* (8*b*) is rotated by 90° with respect to the center of the magnet 18*a* (18*b*). No phase or amplitude sign change happens at this rotational position (0° or t=0). The phase change of module 2-2 occurs when the rotor has rotated 90° when at this rotational position the pole tooth centers face the magnet centers (the respective pole tooth azimuthally overlaps with the respective magnet). At the time point where the I-amplitude or the phase changes (module 2-1 at 0° and 180° and module 2-2 at 90° and 270°) during rotation, the attractive magnetic force between tooth and magnet changes to a repulsion force.

Due to the at least two stator modules, even if in one stator module no magnetic force can be exerted due to a starting position where the tooth and the magnet overlap, a starting torque is effected by the other stator module(s) to get the motor started without any external or internal auxiliary means. In addition to providing always a non-zero starting torque, the torque direction and thus the rotation direction can be preset in that the amplitude sign (+ or –; also denoted as 'phase' or 'polarity') of the current amplitude (or voltage amplitude) is determined according to the intended rotation sense or direction. Summarizing, this outstanding ability to control the motor provides the chance to replace a motor using brushes by this brushless motor having higher efficiency and no brush sparks during operation.

At the controller 242 the desired rotation speed or power for the motor is set via the control lines 266. Preferably, the controller 242 is provided with a pulse width control for adapting the energy of the rectangular signals that are supplied to the FETs (see voltage phase at the coils 220*a, b* of the stator modules 2-1, 2-2) according to the requirements. The upper rectangular current or voltage signal shown in FIG. 33B ("phase stator module 2-1/2-2") is superimposed by a higher rectangular frequency, so that the voltage signal as shown in the third time diagram of FIG. 33B is supplied to the coils 220*a, b* (pulse width at coil 220*a*). This higher rectangular frequency is changed in its pulse width and therefore the energy content is modified. The controller 242 can take this task in the circuit version shown here.

The time diagram of FIG. 33B shows the ideal or static case, for example when starting the motor or with low rotational speed. In this case switching the phase or polarity (via transistors 248 shown in FIG. 34) at the time where the azimuthal center of the poles 8 of the respective stator radially meet the azimuthal center of the magnets 18 is sufficiently fast. It is preferred however that in dependency of the number of poles 8, the rotation speed, the command to accelerate or decelerate the motor speed and the load connected to the motor, the time of changing the phase or polarity is angularly shifted to a rotational position ahead or after the encounter of the azimuthal centers of the poles 8 and magnets 18. E.g. the higher the motor speed the higher is the advance shift of the phase/polarity change with respect to the magnet and pole azimuthal center meeting or crossover. In the case of low number of poles per stator (e.g. 2) and high motor speed the advance angular offset can make up to 20°. On the other hand, if the number of poles per stator is high, e.g. 12, the advance angular offset must be smaller to avoid gearing loss. All such corrections and mathematical operations and mapping are performed by the controller 242 shown in FIG. 34. For example look-up tables are implemented in the software of the controller 242 and for example an angular correction is retrieved from the look-up table by selecting the appropriate (advance/delay) angular offset using the detected rotational speed.

In the lower part of FIG. 34 a possible extension for the recovery of the momentum is shown, the so called push or brake operation. In the push or brake operation the driving energy is set to zero, the transistors 248 of the bridge circuits for the stator excitation are turned off completely. The controller 242 switches or controls then the power current lines to the bridge rectifiers 252 to be conductive and thus enables the flow of the induced current from the coils 220*a, b* of the motor, which is now in generator operation. In generator operation the controller 242 controls a control logic 244 which in turn controls TRIACs 258. Instead of the TRIACs also MOSFETs, thyristors or similar can be provided. The TRIACs 258 are arranged in the line between the coils 220*a, b* and the rectifiers 252 and separate the lines in the drive mode (FETs 248 are switching). At the output of the rectifiers a capacitor 55 smoothes the voltage which is then supplied as direct current voltage to direct current voltage terminal 256, for example in order to recharge the vehicle battery 270.

If then the drive mode is required again, these lines between the coils 220*a, b* and the rectifier 252 are switched off at an appropriate point of time (zero crossing) by turning off the TRIACs 258. The transistor bridge circuit including the FETs can now provide current to the coils 220*a, b* in a controlled manner.

Figure 35:
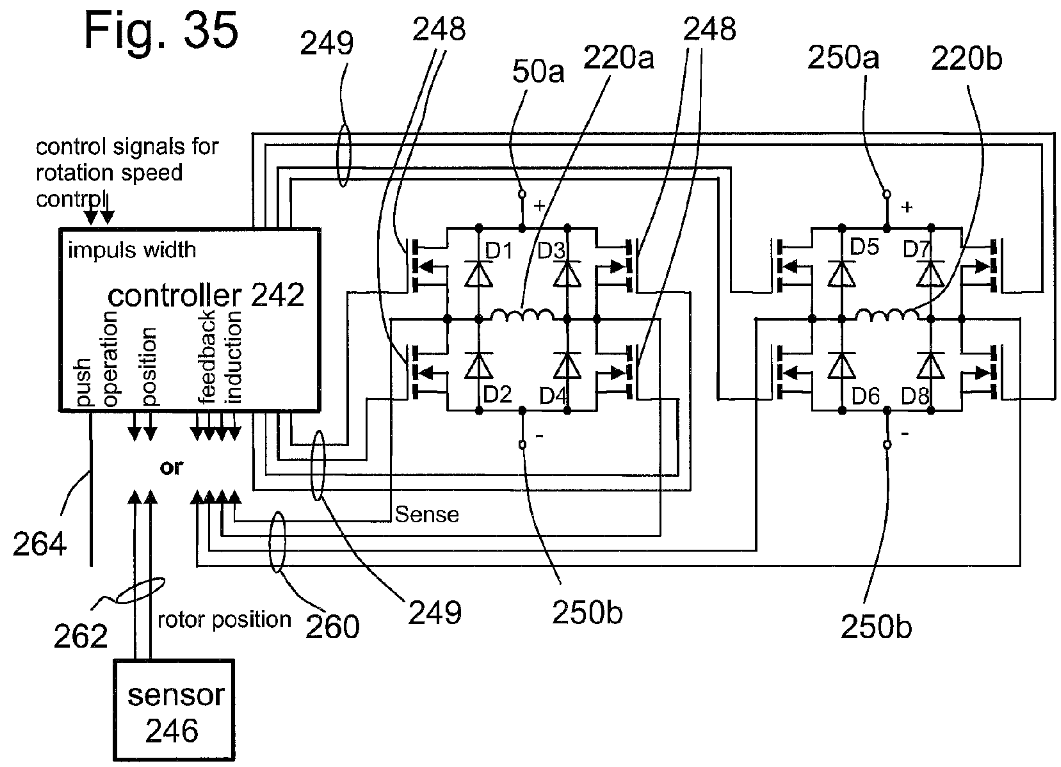
FIG. 35 is a block diagram of an embodiment of the motor unit in FIG. 34 with a simplified rectifier construction.

FIG. 35 shows another embodiment of the generator/motor-arrangement shown in FIG. 34 which uses diodes D1 to D8 parallel to the FETs instead of the rectifier arrangements 252. Elements of the circuit arrangement that are the same to the ones shown in FIG. 34 have the same reference numbers. The diodes D1 to D8 are connected inverse across the switch transistors and also act as free-wheeling diodes as protection against over-voltage pulses, for example at induction peaks during fast switching operations. Per each four diodes a bridge rectifier is provided at each of the stators (D1 to D4 for stator 2-1 (motor coil 220*a*) and D5 to D8 for stator 220*b* (motor coil 220*b*)). In embodiments having more stator coils, correspondingly four free-wheeling diodes are grouped for each (additional) stator coils as a bridge rectifier.

By means of the bridge rectifier arrangements D1-D4, D5-D8 the recovery of the rotation energy is made possible using simple measures, as for example in the so-called push or brake mode of the above motors and/or also when using it as starter-generator for vehicles and similar applications. It is to be noted here that by the electronic design of the power electronic in full bridges a bridge rectifier automatically results due to the four free-wheeling diodes D1-D4, D5-D8, i.e. the separate bridge rectifier arrangements 252 are not required here.

Figure 36:
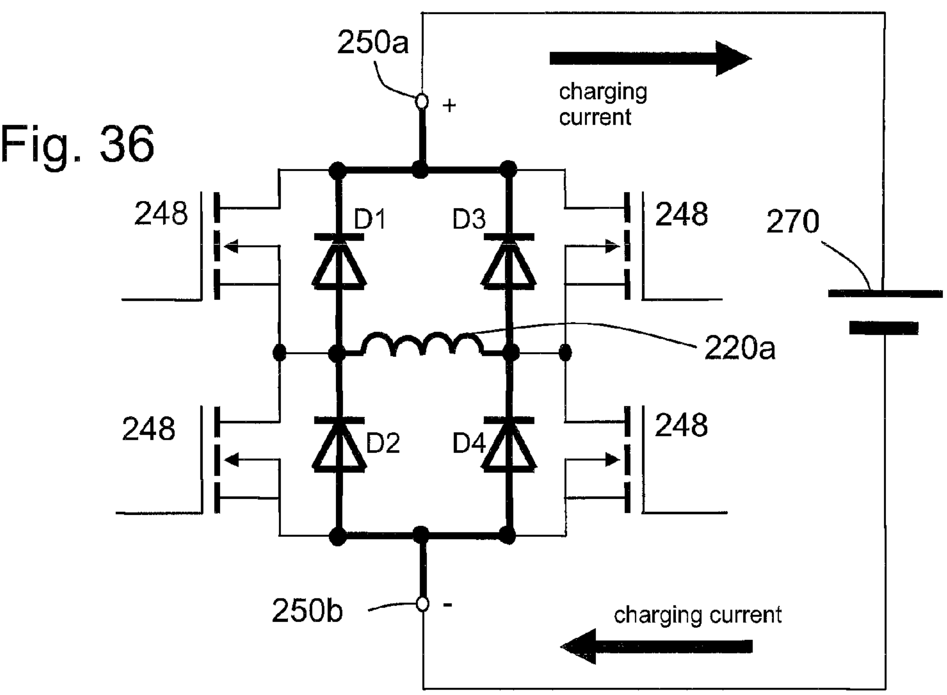
FIG. 36 is an enlarged partial view of FIG. 35.

FIG. 36 shows a detailed portion of the generator/motor arrangement of FIG. 35 and illustrates the mode of operation. Here a power part of a stator commutation at the motor coil 220*a* is shown. The bridge rectifier resulting from the free-wheeling diodes D1 to D4 is singled out by the bold lines and rectifies the AC current generated in the stator coil during the rotation of the rotor (for example in push operation). Therefore, the momentum is being recovered as charging current for a power source battery 270 or a starter battery, respectively.

Figure 37:
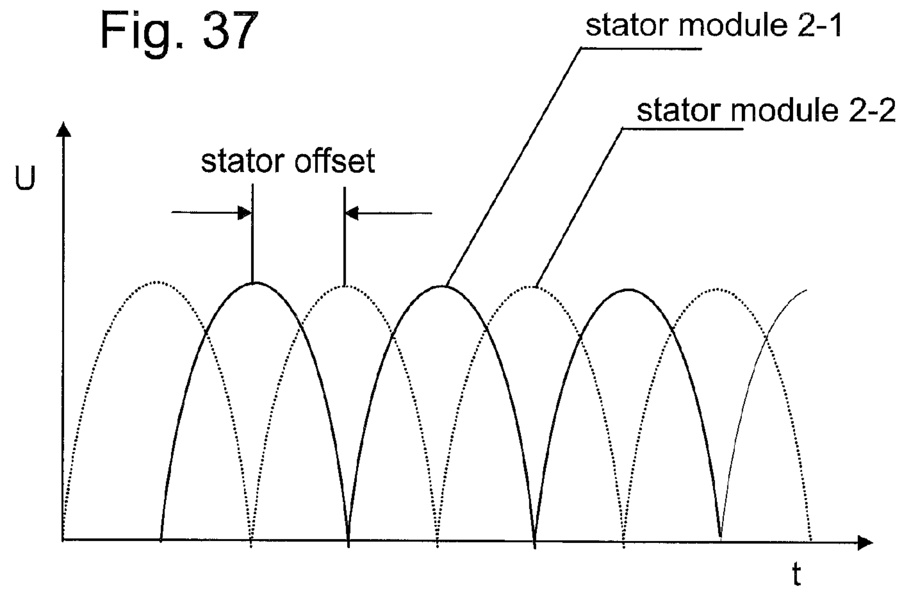
FIG. 37 is a time diagram of the generator voltage gripped and rectified from both stator windings.

The time diagram of FIG. 37 shows the voltage from the two stators rectified with the diodes D1-D4 or D5-D8, wherein stator module 2-1 corresponds to the stator coil 220*a* and stator module 2-2 corresponds to stator coil 220*b*. Due to the parallel connection of the bridge rectifiers D1-D4 and D5-D8 of the corresponding commutating bridges the rectified charging currents/charging voltages combine with each other with a time offset due to the mechanical angular offset α of the stators and therefore the offset of the pole teeth. The resulting DC current voltage does not drop to zero and is easy to be smoothed. When in embodiments more than two stators being angularly offset to each other are used, the degree of smoothing of the combined DC voltage (parallel connected stators 9) is even higher.

Figure 38:
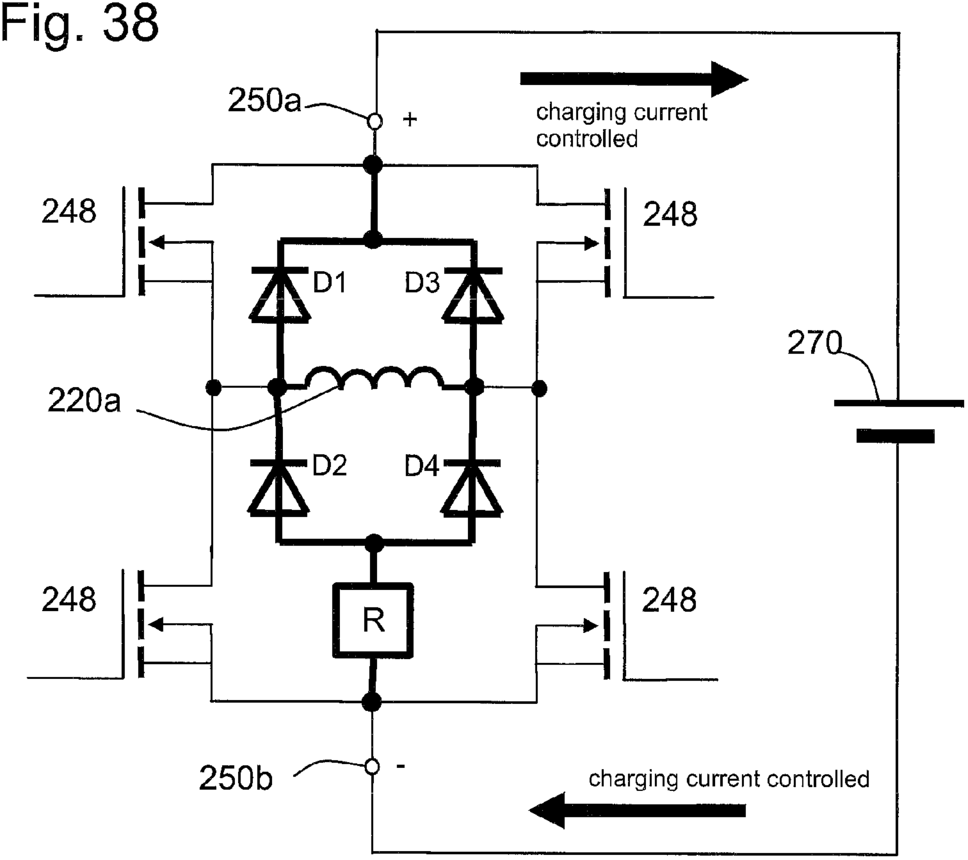
FIG. 38 illustrates another embodiment for the partial circuit of FIG. 36 with a control unit.

FIG. 38 shows a modification of the detail portion shown in FIG. 36. The switching transistors 248 remain turned off in charging operation. Due to the inclusion of a control R into the diodes circuit it is now possible to control the charging current. When the motor including the circuit of FIG. 38 is for example used with a vehicle or to control the charging current in a feedback loop, the brake force can be changed via the controller R as required, such that the braking-energy is transformed into a charging current as far as possible. The controller R also comprises for example a MOSFET power switch which is controlled by a separate controller (not shown). This separate controller has the function of a charging controller for charging the power source or actuation battery 270 and/or of a brake force controller that controls the electrical energy taken from the motor in dependency of the desired braking power. The energy that is been taken for charging and/or braking is controlled by the controller R using pulse width modulation of the switching periods of the power switch for example.

In an embodiment not shown, the rotor comprises a rotor coil and instead of the controller R of FIG. 38 a controller is connected between the rotor coils voltage supply and the rotor coil, such that the rotor magnetic field can be changed under the control of the controller. The electrical energy extracted by the stator coils is changeable thereby.

In an embodiment (not shown) of the generator/motor arrangement of FIGS. 34 to 38 the arrangement only comprises the elements which are required for the generator operation, that means the transistors 248, the sensor 246, the controller 242 and the corresponding circuitry 249, 260, 262, 264 are omitted. In the case of FIG. 34 the control logic includes position detection (the signals of the sense lines 266 are supplied to an extended logic of the control logic 244) in order to control the thyristors 258.

Asynchronous Operation of the Motor and/or the Generator

The motor comprising two stator modules described above is also controllable as an asynchronous motor. This is generally applicable for motors having at least two of the above described stator modules. For the embodiment shown in FIG. 11 and having more than two stator teeth 88*a*, 88*b* a phase comprising a higher basic frequency is applied instead of the phase or voltage signals ("phase of stator module 2-1, 2-2" shown in FIG. 33B). Therefore, in the coils 220*a/b* a moving field or a field rotation running ahead is generated which actuates the rotor 1. The detection of the rotation sense of the motor respectively the relative position of the motor for setting the selected sense of rotation is embodied as described in connection with FIG. 34.

Also in the case of the phase signal having a higher ground frequency for the asynchronous operation the ground frequency itself can be superimposed again by a pulse width modulated higher frequency (corresponding to the phase signal shown in FIG. 33B below) in order to implement a power control. For such a control the circuit shown in FIG. 34 can be applied, wherein the controller 242 and the FETs 248 are correspondingly adapted to higher frequencies.

Further Embodiments of the Electrical Machine

As an exception for the brushless embodiment when using permanent magnets as rotor poles, there is the possibility of using an electrically excited rotor. Then the poles are shaped as winded rotor teeth. The current is then supplied over sliding rings, especially for use as vehicle dynamo or as controlled direct current generator.

In the above described generator/motor arrangement or in the mere generator arrangement an electrically excited rotor alternately winded in series (replace the alternating permanent magnets) can be provided for the generator operation as with the asynchronous powered motor. During or for the generator operation, charging current output by the bridge rectifier is supplied to the coils of the rotor by pulse width modulation, linear control or simple ON/OFF (control operation) and thereby is used for the rotor excitation.

In a further embodiment the number of the stator and runner poles deviates from each other slightly and serves for reduction of detent torques which is often observed when using the same number of poles.

When using the machine as motor, many different applications exist as the system can be assembled in a modular way. For example the individual stators can be assembled in a line and with angular offset to each other. The stators may be screwed or plugged and therefore the whole stator package can be expanded arbitrarily. When using identical stators as non-variable part it reduces the manufacturing costs as the basic elements in different combinations (number/angular offset) result in different generator/motor types. A brushless motor assembled in this way is electronically commutated.

In an embodiment (not shown) of the motor of FIGS. 33A to 38 the stator is electrically excited instead of the brushless version wherein the poles of the rotor comprise permanent magnets. Hereby more control options for the motor are given.

It is understood that in the above illustrated embodiments individual components, components or assemblies of an embodiment can be applied additionally or by replacement in another embodiment. For example, the wedge construction or the onionskin construction is also applicable in the implementations relating to an internal rotor without further ado.

What is claimed is:

1. An electric motor having at least two coaxially aligned stators disposed about a central axis, and a rotor concentric to the at least two stators about the central axis, wherein each stator comprises:

a first and a second partial shell, wherein each partial shell comprises a shell bottom and n poles, where each pole forms a tooth that extend axially from the shell bottom, the poles having at least one common coil or winding, wherein the first partial shell and the second partial shell are assembled together such that the teeth of the first partial shell and the second partial shell are arranged circumferentially in alternating fashion.

wherein the at least one coil or winding is received between the assembled first and second partial shells, and wherein n is a positive integer greater than or equal to 1.

2. The electric motor of claim 1, wherein the poles of the at least two stators are offset to each other by the angle of 360°/(4×n) with respect to the central axis.

3. The electric motor of claim 1, wherein the poles of a rotor associated with a first of the at least two stators and the poles of a rotor associated with a second of the at least two stators are offset from each other by an angle of 360°/(4×n) with respect to the central axis.

4. The electric motor of claim 1, wherein the teeth of the first and second partial shells are interdigitally disposed circumferentially about the central axis such that they mesh with each other at an intervening distance, and wherein the spacing between the partial shells of each stator substantially reduces magnetic flux between adjacent teeth.

5. The electric motor of claim 1, wherein when the at least two stators are disposed within the rotor the teeth of each stator are formed along the outer circumference of the shell bottoms to form an external tooth rim.

6. The electric motor of claim 1, wherein when the at least two stators are disposed within the rotor at least an internal partial rim is formed along the inner circumference of one or both partial shells of each stator to comprise an axle yoke.

7. The electric motor of claim 1, wherein when the rotor is disposed within the at least two stators, the teeth of each stator are formed along the inner circumference of the shell bottoms to form in internal tooth rim.

8. The electric motor of claim 1, wherein the rotor is disposed within the at least two stators at least an external partial rim is formed along the outer circumference of one or both partial shells of each stator to comprise an external yoke.

9. The electric motor of claim 1, wherein at least one of the partial shells comprises a stack of thin sheets where the sheets are electrically insulated from each other or selectively electrically connected.

10. The electric motor of claim 9, wherein the thin sheets are stacked in an onionskin manner.

11. The electric motor of claim 1, wherein the shell bottom of each partial shell has one or more recesses corresponding to the number of the pole teeth of an opposing partial shell of the stator, such that protruding ends of the pole teeth of the opposing partial shell mesh or engage the one or more recesses formed in the partial shells when the partial shells are assembled to form a stator module.

12. The electric motor of claim 11, wherein the protruding ends of the pole teeth terminate flush with the external shell bottom surface of the opposing partial shell.

13. The electric motor of claim 1, wherein the electric motor is employable as a generator.

14. The electric motor of claim 13, wherein the generator comprises at least two stators and at least one rectifier for each common coil or winding of each one of the stators.

15. A method of operating an electric motor, comprising:

providing an electric motor comprising:

at least two coaxially aligned stators disposed about a central axis and a rotor concentric to the at least two stators about the central axis, wherein each stator comprises at least two poles, and wherein the rotor comprises at least two magnets arranged about the circumference of the rotor, such that each pole of the stators faces a corresponding magnet of the rotor and the azimuthal center of each pole is radially facing the azimuthal center of a corresponding magnet, wherein each stator has at least one coil or winding common to the poles, wherein the at least two stators are mutually angularly offset by each other such that poles of at least one of the stators are angularly offset to the poles of at least the other one of the stators by an angle of 360°(k×2n) with respect to the central axis, where k equals the number of stators and is a positive integer greater than or equal to 2 or multiples of two thereof, and where n equals one-half the number of poles per stator and is a positive integer greater than or equal to 1, wherein the electric motor further comprises a control unit, a rotor position detecting means and one bridge circuit connected to the at least one common coil or winding of each one of the at least two stators, and wherein each one of the bridge circuits comprises four power switches connected to the at least one coil or winding of the stator, providing a first polarity of voltage supplied to the at least one coil or winding, where a first pair of power switches is activated and a second pair of power switches is deactivated; and providing a second polarity of voltage supplied to the at least one coil or winding, where the second pair of power switches is activated and the first pair is deactivated;

wherein the control unit controls the power switches in dependency of the rotor position and motor power demand and is adapted to execute the following steps:

detecting the rotor position using the rotor position detecting means; and changing the polarity of the voltage supplied to each of the at least two stators in dependency of the rotor position, wherein the polarity of each of the at least two stators is changed at a different rotor position.

16. The method of claim 15, wherein the control unit is further adapted to change the polarity of the voltage supplied to the stator when the azimuthal center of the poles of this stator are in radial alignment to the azimuthal center of the magnets of the rotor, or with an angular offset to the rotor position at which the azimuthal center of the poles of this stator are in radial alignment to the azimuthal center of the magnets of the rotor, wherein the angular offset is depending on one or more of the following: the rotor speed, the motor load, the number of poles per stator.

17. The method of claim 15, wherein the control unit is further adapted to apply the voltage to the stators in pulse width modulation, wherein the power supplied to the motor is modified by the control unit by modifying the pulse width.

18. The electric motor of claim 9, wherein the thin sheets are at least partially circular arc section shaped or annular arc section shaped sheets such that they expand radially outwards from the central axis in a wedge-shaped fashion.

* * * * *